United States Patent
Ahmed et al.

(10) Patent No.: US 12,535,450 B1
(45) Date of Patent: Jan. 27, 2026

(54) INDIUM OXIDE DOPED ZINC OXIDE DECORATED MESOPOROUS CARBON NANOCOMPOSITE AS A DOPAMINE SENSOR

(71) Applicant: NAJRAN UNIVERSITY, Najran (SA)

(72) Inventors: Jahir Ahmed, Najran (SA); Farid A. Harraz, Najran (SA); M. Faisal, Najran (SA); Jari S. Algethami, Najran (SA); Mabkhoot Alsaiari, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 0 days.

(21) Appl. No.: 19/186,756

(22) Filed: Apr. 23, 2025

Related U.S. Application Data

(60) Provisional application No. 63/740,048, filed on Dec. 30, 2024.

(51) Int. Cl.
*G01N 27/327* (2006.01)
*G01N 27/30* (2006.01)
*G01N 33/94* (2006.01)

(52) U.S. Cl.
CPC ....... *G01N 27/3278* (2013.01); *G01N 27/308* (2013.01); *G01N 33/9413* (2013.01)

(58) Field of Classification Search
CPC .............. G01N 27/308; G01N 27/3278; G01N 33/9413
See application file for complete search history.

(56) References Cited

U.S. PATENT DOCUMENTS

2007/0128707 A1    6/2007   Rorrer et al.
2022/0299459 A1    9/2022   Taghipour

FOREIGN PATENT DOCUMENTS

CN        104749235 A      7/2015
CN        111847421 A     10/2020

OTHER PUBLICATIONS

M.A. Rashed, A Highly Efficient Nonenzymatic Hydrogen Peroxide Electrochemical Sensor Using Mesoporous Carbon Doped ZnO Nanocomposite, Journal of The Electrochemical Society, 2021 (168), 027512, pp. 1-10 (Year: 2021).*
X. Liang, Effect of resonant tunneling modulation on ZnO/In2O3 heterojunction nanocomposite in efficient detection of NO2 gas at room temperature, Sensors and Actuators: B. Chemical, 2021 (329), 129230, pp. 1-7 (Year: 2021).*
V. Parihar, A Brief Review Of Structural, Electrical And Electrochemical Properties Of Zinc Oxide Nanoparticles, Rev. Adv. Mater. Sci. 2018 (53), pp. 119-130 (Year: 2018).*
M. Gholami, In2O3—ZnO nanocomposites: High sensor response and selectivity to ethanol, Sensors and Actuators B 2015 (212), pp. 395-403 (Year: 2015).*

(Continued)

*Primary Examiner* — C. Sun
(74) *Attorney, Agent, or Firm* — Oblon, McClelland, Maier & Neustadt, L.L.P.

(57) ABSTRACT

A dopamine (DA) sensor includes a glassy carbon electrode including an indium oxide doped zinc oxide ($In_2O_3$-doped ZnO) decorated mesoporous carbon ($In_2O_3 \cdot ZnO@MC$) nanocomposite material. The $In_2O_3 \cdot ZnO@MC$ includes aggregates of spherical $In_2O_3$ nanoparticles (NPs) and cubic ZnO NPs dispersed on the surface of the mesoporous carbon.

20 Claims, 26 Drawing Sheets

(56) References Cited

OTHER PUBLICATIONS

X. Wang, In Nanoparticles Decorated ZnO Hierarchical Structures for n-Butanol Senor, Applied Nano Materials, 2020(3), pp. 3295-3304 (Year: 2020).*

Changhui Zhao, et al., "High Sensitivity and Low Detection Limit of Formaldehyde Sensor Based on In2O3@ZnO@ZIF-CoZn Core-Shell Nanofibers", IEEE Sensors Journal, vol. 24, Issue 16, Aug. 15, 2024, pp. 25337-25345.

* cited by examiner

INDIUM OXIDE DOPED ZINC OXIDE DECORATED MESOPOROUS CARBON NANOCOMPOSITE AS A DOPAMINE SENSOR

CROSS REFERENCE TO RELATED APPLICATION

This application claims the benefit of U.S. Provisional Application No. 63/740,048, filed Dec. 30, 2024, which is incorporated herein by reference in its entirety.

STATEMENT REGARDING PRIOR DISCLOSURE BY THE INVENTORS

Aspects of the present disclosure are described in Ahmed, J; Faisal, M.; Algethami, J; Alsaiari, M; Harraz, F.; "A novel $In_2O_3$-doped ZnO decorated mesoporous carbon nanocomposite as a sensitive and selective dopamine electrochemical sensor" published in Volume 29, Journal of Materials Research and Technology on Jan. 18, 2024, which is incorporated herein by reference in its entirety.

STATEMENT OF ACKNOWLEDGEMENT

Support provided by the Deanship of Scientific Research at Najran University, Saudi Arabia, under the Distinguished Research Program grant code (NU/DRP/SERC/12/34) is gratefully acknowledged.

BACKGROUND

Technical Field

The present disclosure is directed to a sensor, more particularly, a dopamine (DA) sensor including a glassy carbon electrode (GCE) including an indium oxide doped zinc oxide ($In_2O_3$-doped ZnO) decorated mesoporous carbon ($In_2O_3ZnO@MC$) nanocomposite material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Dopamine (DA) is a neurotransmitter—a chemical messenger in the brain and nervous system that plays a role in various functions, including mood regulation, movement, reward processing, and motivation. It is produced by nerve cells to transmit messages. Due to its ability to influence memory preservation in the prefrontal cortex, DA is affectionately known as the "happiness molecule". It is part of a group of neurotransmitters called catecholamines, which are derived from the amino acid tyrosin. When DA becomes imbalanced in the blood serum, it may contribute to conditions such as Parkinson's disease and schizophrenia. Additionally, DA operates in several biological processes, including neurological, renal, hormonal, and cardiovascular functions.

Consequently, an efficient approach to detecting DA is imperative for medical diagnosis. Several techniques, including colorimetry, chromatography, fluorescence, and chemiluminescence, have previously been developed for DA detection. However, the methods often involve expensive equipment or lengthy processes to obtain consistent analytical results. In contrast, electrochemical sensors are generally considered the most desirable for DA detection among available methods due to the cost-effectiveness, rapid response times, and heightened sensitivity. It is worth noting that some unmodified electrodes may oxidize DA, albeit at relatively high potentials, and are susceptible to interference from substances like ascorbic acid.

Moreover, electrode fouling is a common challenge during real-world DA determinations. In response to these issues, scientists have devoted efforts to address them, leading to the development of various nanomaterials for efficient electrode modifications aimed at improving DA detection. Regrettably, conventional electrodes like platinum electrode (PtE) and gold electrode (AuE) often display weak responses, posing challenges when attempting to accurately measure DA. Moreover, the metal electrodes commonly encounter issues related to overpotential. Consequently, the development of innovative nanomaterials becomes imperative in fabricating electrodes with exceptional electrocatalytic capabilities for DA detection.

Each of the aforementioned DA detection methods suffers from one or more drawbacks hindering their adoption. Accordingly, it is one object of the present disclosure to provide a detection method that may circumvent problems like use of expensive equipment or lengthy processes, electrode fouling, cross-reactivity, limited sensitivity, short lifespan, interference from other compounds, and environmental instability etc., known in the art.

SUMMARY

In an exemplary embodiment, a dopamine (DA) sensor is described. The sensor includes a glassy carbon electrode (GCE) including an indium oxide doped zinc oxide ($In_2O_3$-doped ZnO) decorated mesoporous carbon ($In_2O_3 \cdot ZnO@MC$) nanocomposite material. The $In_2O_3 \cdot ZnO@MC$ includes aggregates of spherical $In_2O_3$ nanoparticles (NPs) and cubic ZnO NPs dispersed on the surface of the mesoporous carbon.

In some embodiments, the amount of indium (In) in the $In_2O_3 \cdot ZnO@MC$ nanocomposite material is in a range from 10 (weight percent) wt. % to 30 wt. % based on the total weight of the $In_2O_3 \cdot ZnO@MC$ nanocomposite material.

In some embodiments, the amount of In in the $In_2O_3 \cdot ZnO@MC$ nanocomposite material is in a range from 15 wt. % to 25 wt. % based on the total weight of the $In_2O_3 \cdot ZnO@MC$ nanocomposite material.

In some embodiments, the amount of In in the $In_2O_3 \cdot ZnO@MC$ nanocomposite material is in a range from 20 wt. % to 25 wt. % based on the total weight of the $In_2O_3 \cdot ZnO@MC$ nanocomposite material.

In some embodiments, the $In_2O_3 \cdot ZnO@MC$ nanocomposite material includes granular $In_2O_3 \cdot ZnO$ NPs dispersed on a mesoporous carbon matrix.

In some embodiments, the amount of zinc (Zn) in the $In_2O_3 \cdot ZnO@MC$ nanocomposite material is in a range from 30 wt. % to 70 wt. % based on the total weight of the $In_2O_3 \cdot ZnO@MC$ nanocomposite material, the amount of oxygen (O) in the $In_2O_3 \cdot ZnO@MC$ nanocomposite material is in a range from 10 wt. % to 30 wt. % based on the total weight of the $In_2O_3 \cdot ZnO@MC$ nanocomposite material, and the amount of carbon (C) in the $In_2O_3 \cdot ZnO@MC$ nanocomposite material is in a range from 1 wt. % to 25 wt. % based on the total weight of the $In_2O_3 \cdot ZnO@MC$ nanocomposite material.

In some embodiments, the amount of Zn in the In$_2$O$_3$·ZnO@MC nanocomposite material is in a range from 40 wt. % to 60 wt. % based on the total weight of the In$_2$O$_3$·ZnO@MC nanocomposite material, the amount of 0 in the In$_2$O$_3$·ZnO@MC nanocomposite material is in a range from 12 wt. % to 25 wt. % based on the total weight of the In$_2$O$_3$·ZnO@MC nanocomposite material, and the amount of C in the In$_2$O$_3$·ZnO@MC nanocomposite material is in a range from 5 wt. % to 15 wt. % based on the total weight of the In$_2$O$_3$·ZnO@MC nanocomposite material.

In some embodiments, the amount of Zn in the In$_2$O$_3$·ZnO@MC nanocomposite material is in a range from 45 wt. % to 55 wt. % based on the total weight of the In$_2$O$_3$·ZnO@MC nanocomposite material, the amount of 0 in the In$_2$O$_3$·ZnO@MC nanocomposite material is in a range from 14 wt. % to 20 wt. % based on the total weight of the In$_2$O$_3$·ZnO@MC nanocomposite material, and the amount of C in the In$_2$O$_3$·ZnO@MC nanocomposite material is in a range from 8 wt. % to 12 wt. % based on the total weight of the In$_2$O$_3$·ZnO@MC nanocomposite material.

In some embodiments, the sensor has a sensitivity for DA of from to 0.10 microampere per micromolar per square centimeter ($\mu A \cdot \mu M^{-1} \cdot cm^{-2}$) to 0.30 $\mu A \cdot \mu M^{-1} \cdot cm^{-2}$.

In some embodiments, the sensor has a sensitivity for DA of from to 0.15 $\mu A \cdot \mu M^{-1} \cdot cm^{-2}$ to 0.25 $\mu A \cdot \mu M^{-1} \cdot cm^{-2}$.

In some embodiments, the sensor has a sensitivity for DA of from to 0.20 $\mu A \cdot \mu M^{-1} \cdot cm^{-2}$ to 0.25 $\mu A \cdot \mu M^{-1} \cdot cm^{-2}$.

In some embodiments, the sensor has a limit of detection (LOD) for DA of less than or equal to 35 nanomolar (nM).

In some embodiments, the sensor has a LOD for DA of less than or equal to 30 nM.

In some embodiments, the sensor has a LOD for DA of less than or equal to 25 nM.

In some embodiments, the sensor has a linear detection range for DA spanning from 0.5 $\mu M$ to 2056 $\mu M$.

In some embodiments, the sensor has a linear detection range for DA spanning from 0.5 $\mu M$ to 1000 $\mu M$.

In some embodiments, the sensor has a linear detection range for DA spanning from 0.5 $\mu M$ to 500 $\mu M$.

In some embodiments, the sensor has a relative standard deviation (RSD) for detecting DA of less than or equal to 6%.

In some embodiments, the sensor has an RSD for detecting DA of less than or equal to 5%.

In some embodiments, the sensor has an RSD for detecting DA of less than or equal to 4.5%.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
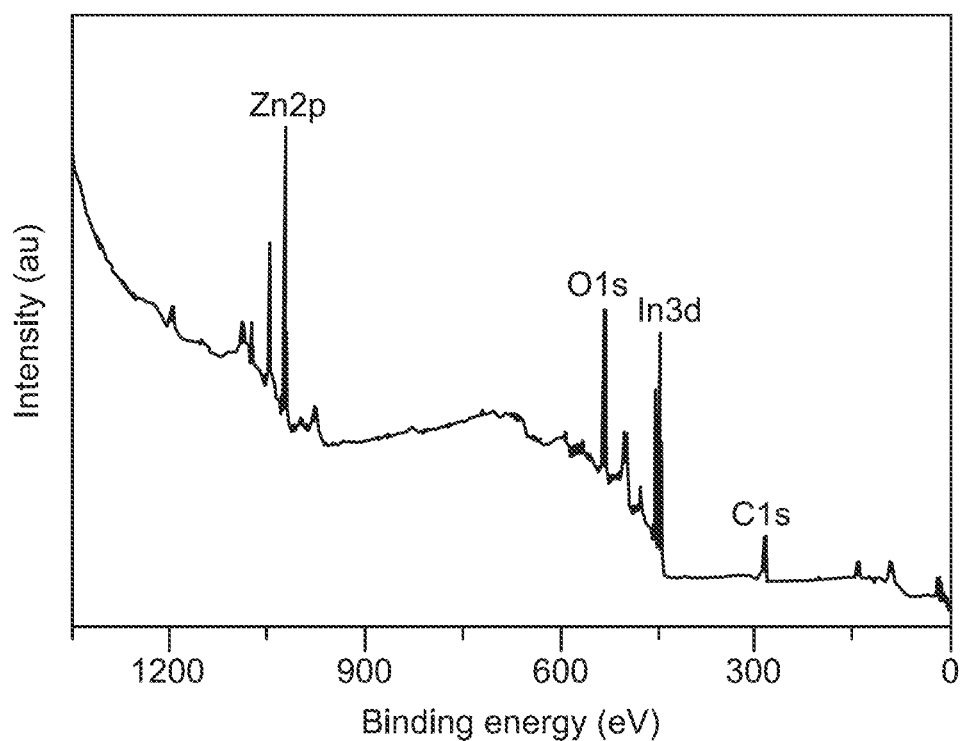
FIG. 1A is a survey spectrum for X-ray photoelectron spectroscopy (XPS) of indium oxide doped zinc oxide decorated mesoporous carbon (In$_2$O$_3$ZnO@MC) nanocomposite, according to certain embodiments.
Figure 1B:
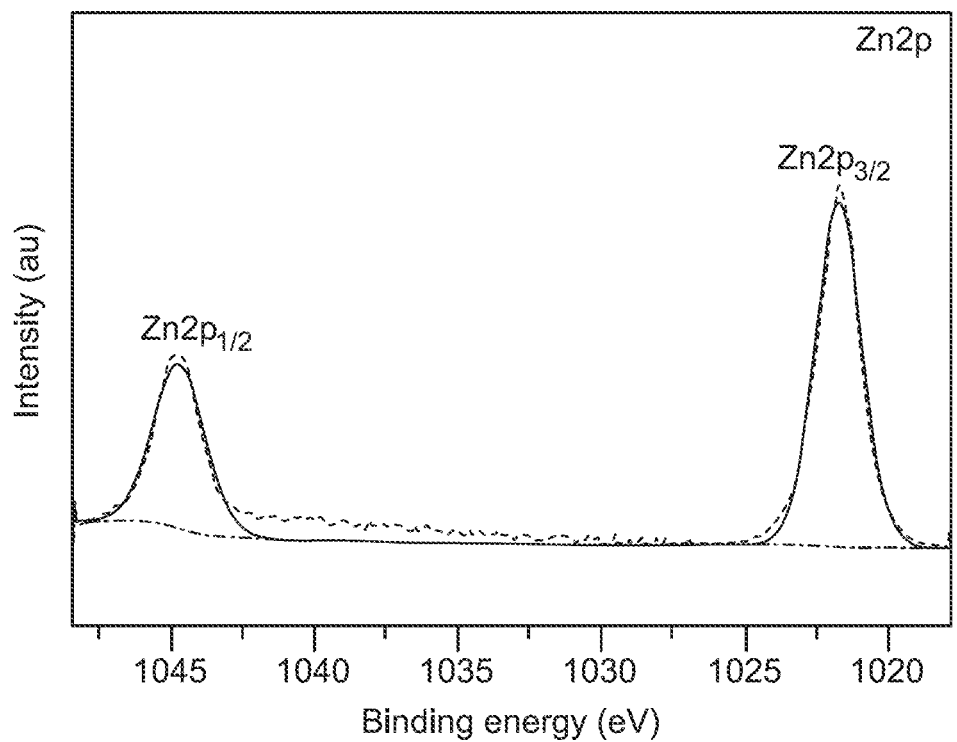
FIG. 1B is an XPS spectrum of In$_2$O$_3$·ZnO@MC nanocomposite for Zn 2p, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

When amounts, concentrations, dimensions and other parameters are expressed in the form of a range, a preferable range, an upper limit value, a lower limit value or preferable upper and lower limit values, it should be understood that any ranges obtainable by combining any upper limit or preferable value with any lower limit or preferable value are also specifically disclosed, irrespective of whether the obtained ranges are clearly mentioned in the context.

As used herein, the term 'compound' refers to a chemical entity, regardless of its phase-solid, liquid, or gaseous—as well as its state-crude mixture, purified, or isolated.

As used herein, the term 'amount' refers to the level or concentration of one or more reactants, catalysts, or materials present in a reaction mixture.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nm.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram (cm$^3$/g) and is a parameter in characterizing the porous structure of materials, such as adsorbents or catalysts.

As used herein, the term 'porous material' refers to a material that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SE M), and X-ray computed tomography (XRCT).

As used herein, 'dopamine (DA)' refers to a biomolecule involved in neurotransmission, which plays a role in regulating mood, movement, and various other physiological processes. DA is implicated in a variety of neurological disorders, including Parkinson's disease, schizophrenia, and depression. Therefore, accurate detection of DA enables the swift diagnosis of conditions arising from abnormal DA levels, enabling timely intervention and treatment. Monitoring DA levels also aid in understanding disease mechanisms and assessing the effectiveness of therapeutic strategies.

As used herein, 'linear detection range' refers to the range of concentrations or values over which the response of a sensor, instrument, or detection system is directly proportional to the quantity being measured. In this range, the output signal increases or decreases in a predictable and consistent manner in relation to the analyte concentration or intensity, allowing for accurate and reliable measurements.

As used herein, 'limit of detection (LOD)' refers to the lowest concentration of a substance that can be reliably detected by a sensor.

As used herein, 'relative standard deviation (RSD)' refers to a measure of the precision or variability of a set of data, expressed as the standard deviation divided by the mean, often multiplied by 100 to get a percentage. It is used to assess the consistency of measurements or results, with a lower RSD indicating higher precision. RSD is commonly used in analytical chemistry, statistics, and quality control to compare the variation between different datasets or experimental conditions.

As used herein, the term 'electrode' refers to an electrical conductor used to contact a non-metallic part of a circuit, such as a semiconductor, an electrolyte, a vacuum, or air.

As used herein, the term 'electrochemical cell' refers to a device capable of either generating electrical energy from chemical reactions or using electrical energy to cause chemical reactions.

As used herein, the term 'working electrode' refers to an electrode in an electrochemical cell/device/sensor on which the electrochemical reaction of interest is occurring.

As used herein, the term 'counter-electrode' refers to an electrode used in an electrochemical cell for voltametric analysis or other reactions in which an electric current flows.

As used herein, the term 'glassy carbon' refers to a non-graphitizing carbon which combines glassy and ceramic properties with those of graphite.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspect of the present disclosure is directed to a method of forming a nanocomposite including indium oxide ($In_2O_3$)-doped zinc oxide (ZnO) decorated on mesoporous carbon ($In_2O_3 \cdot ZnO@MC$) as an active nanomaterial for fabricating a glassy carbon electrode (GCE). The structural and morphological properties of $In_2O_3 \cdot ZnO@MC$ were analyzed using various characterization techniques to confirm its effectiveness as a sensing nanomaterial. This sensor enables precise DA measurements with high sensitivity, selectivity, and excellent reproducibility, repeatability, and stability.

A dopamine (DA) sensor is described. The sensor includes a glassy carbon electrode including an indium oxide doped zinc oxide ($In_2O_3$-doped ZnO) decorated mesoporous carbon ($In_2O_3 \cdot ZnO@MC$) nanocomposite material.

In some embodiments, a DA sensor, includes a glassy carbon electrode including a $In_2O_3$-doped ZnO decorated mesoporous carbon ($In_2O_3 \cdot ZnO@MC$) nanocomposite material. Mesoporous carbon is a carbon material with pore sizes ranging from 2 to 50 nm, having high surface area and tunable porosity. This structure enhances its capabilities for sensing applications, as it allows effective interaction with various molecules, improving the sensitivity and selectivity of sensors used for detecting gases, chemicals, or biomolecules.

In some embodiments, $In_2O_3 \cdot ZnO@MC$ includes aggregates of spherical $In_2O_3$ NPs and cubic ZnO NPs dispersed on the surface of the mesoporous carbon. In alternate embodiments, the $In_2O_3$ NPs and cubic ZnO NPs may exist in different shapes such as rods, cones, cuboidal, pyramidical, cylindrical, platelet, wires, crystals, rectangles, triangles, prisms, discs, ribbons, blocks, beads, discs, barrels, granules, whiskers, flakes, foils, powders, boxes, stars, flowers, polygonal like trigonal, pentagonal, hexagonal, etc., and mixtures thereof. In some embodiments, the $In_2O_3 \cdot ZnO@MC$ nanocomposite material includes granular $In_2O_3 \cdot ZnO$ NPs dispersed on a mesoporous carbon matrix. $In_2O_3 \cdot ZnO$ NPs refers to NPs that have both $In_2O_3$ and ZnO content, also referred to as indium doped ZnO NPs.

In some embodiments, the $In_2O_3 \cdot ZnO@MC$ nanocomposite material includes granular $In_2O_3 \cdot ZnO$ NPs dispersed on a mesoporous carbon matrix. The particles cover at least 50%, preferably 55%, preferably 60%, preferably 65%, preferably 70%, preferably 75%, preferably 80%, preferably 85%, preferably 90%, and preferably >95% of the mesoporous carbon matrix. In some embodiments, granular $In_2O_3 \cdot ZnO$ NPs may be dispersed on the mesoporous carbon matrix by one of the techniques including, but not limited to, impregnation, sol-gel, hydrothermal synthesis, chemical vapor deposition (CV D), co-precipitation, ultrasonic-assisted dispersion, and surface functionalization. In some embodiments, $In_2O_3 \cdot ZnO@MC$ is a working electrode.

The electrochemical cell also includes a reference electrode and a counter electrode. A working electrode, a counter electrode, and a reference electrode are contacted with an aqueous solution for the electrochemical sensing. In some embodiments, the counter electrode is made from a material selected from the group consisting of platinum, gold, and carbon. In some embodiments, the counter electrode may contain an electrically-conductive material such as platinum, platinum-iridium alloy, iridium, titanium, titanium alloy, stainless steel, gold, cobalt alloy, and/or some other electrically-conductive material, where an 'electrically-conductive material' as defined here is a substance with an electrical resistivity of at most $10^{-6}$ ohm meter ($\Omega \cdot m$), preferably at most $10^{-7}$ $\Omega \cdot m$, more preferably at most $10^{-8}$ $\Omega \cdot m$ at a temperature of 20-25° C. The form of the counter electrode may be generally relevant only in that it needs to supply sufficient current to the electrolyte solution to support the current required for the electrochemical reaction of interest. The counter electrode material should thus be sufficiently inert to withstand the chemical conditions in the electrolyte solution, such as acidic or basic pH values, without substantially degrading during the electrochemical reaction. The counter electrode should preferably not leach out any chemical substance that interferes with the electrochemical reaction or might lead to undesirable electrode contamination. In a preferred embodiment, the counter electrode is a platinum spiral electrode.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DH E), a mercury-mercurous sulfate electrode, mercury/mercuric oxide (Hg/HgO) electrode, or some other type of electrode. In a preferred embodiment, a reference electrode is an Ag/AgCl electrode. However, in some embodiments, the electrochemical cell does not include a third electrode.

In some embodiments, the aqueous solution includes phosphate buffered saline (PBS) at a concentration of 0.05-1.0 molar (M), preferably 0.05-0.5 molar (M), preferably 0.1-0.45, preferably 0.15-0.4, preferably 0.2-0.35, and preferably 0.25-0.3 M. In a preferred embodiment, the aqueous solution includes PBS at a concentration of 1 M. Preferably, to maintain uniform concentrations and/or temperatures of the aqueous solution, the aqueous solution may be stirred or agitated during measurement. The stirring or agitating may be done intermittently or continuously. This stirring or agitating may be done by a magnetic stir bar, a stirring rod, an impeller, a shaking platform, a pump, a sonicator, a gas bubbler, or some other device. Preferably, the stirring is done by an impeller or a magnetic stir bar.

In some embodiments, the amount of indium (In) in the $In_2O_3 \cdot ZnO@MC$ nanocomposite material is in a range from 5-50 weight percent (wt. %), preferably 10-30 weight percent (wt. %), preferably 11-29 wt. %, preferably 12-28 wt. %, preferably 13-27 wt. %, preferably 14-26 wt. %, preferably 15-25 wt. %, preferably 16-25 wt. %, preferably 17-25 wt. %, preferably 18-25 wt. %, and preferably 19-25 wt. %, based on the total weight of the $In_2O_3 \cdot ZnO@MC$ nanocomposite material. In some embodiments, the amount of In in the $In_2O_3 \cdot ZnO@MC$ nanocomposite material is in a range from 20-25 wt. %, preferably 21-24 wt. %, and preferably 22-23 wt. %, based on the total weight of the $In_2O_3 \cdot ZnO@MC$ nanocomposite material. In a preferred embodiment, the amount of In in the $In_2O_3 \cdot ZnO@MC$ nanocomposite material is 22.68 wt. %.

In some embodiments, the amount of zinc (Zn) in the $In_2O_3 \cdot ZnO@MC$ nanocomposite material is in a range from 20-80 wt. %, preferably 30-70 wt. %, preferably 35-65 wt. %, preferably 40-60 wt. %, preferably 45-55 wt. %, the amount of oxygen (O) in the $In_2O_3 \cdot ZnO@MC$ nanocomposite material is in a range from 5-40 wt. %, preferably 10-30 wt. %, preferably 11-29 wt. %, preferably 12-28 wt. %, preferably 13-27 wt. %, preferably 14-23 wt. %, preferably 14-20 wt. %, preferably 15.5 to 17 wt. %, and the amount of carbon (C) in the $In_2O_3 \cdot ZnO@MC$ nanocomposite material is in a range from 1-25 wt. %, preferably 2-24 wt. %, preferably 3-23 wt. %, preferably 4-22 wt. %, preferably 5-21 wt. %, preferably 6-20 wt. %, preferably 7-15 wt. %, preferably 8-13 wt. %, preferably 9-11 wt. %, all based on the total weight of the $In_2O_3 \cdot ZnO@MC$ nanocomposite material. In a preferred embodiment, the amount of Zn, 0 and C in the $In_2O_3 \cdot ZnO@MC$ nanocomposite is 51.47 wt. %, 16.06 wt. % and 9.79 wt. %, respectively.

In some embodiments, a DA sensor has a sensitivity for DA of 0.05-0.40 microamperes per micromolar per square centimeter ($\mu A \cdot \mu M^{-1} \cdot cm^{-2}$), 0.10-0.30 $\mu A \cdot \mu M^{-1} \cdot cm^{-2}$, preferably 0.11-0.29 $\mu A \cdot \mu M^{-1} \cdot cm^{-2}$, preferably 0.12-0.28 $\mu A \cdot \mu M^{-1} \cdot cm^2$, preferably 0.13-0.27 $\mu A \cdot \mu M^{-1} \cdot cm^{-2}$, preferably 0.14-0.26 $\mu A \cdot \mu M^{-1} \cdot cm^{-2}$, preferably 0.15-0.25 $\mu A \cdot \mu M^{-1} \cdot cm^{-2}$, preferably 0.16-0.24 $\mu A \cdot \mu M^{-1} \cdot cm^2$, preferably 0.17-0.23 $\mu A \cdot \mu M^{-1} \cdot cm^2$, preferably 0.18-0.22 $\mu A \cdot \mu M^{-1} \cdot cm^2$, preferably 0.20-0.22 $\mu A \cdot \mu M^{-1} \cdot cm^2$. In a preferred embodiment, the sensitivity of DA sensor is 0.2153 $\mu A \cdot \mu M^{-1} \cdot cm^{-2}$.

In some embodiments, the sensor has a LOD for DA of less than or equal to 35 nanomolar (nM), preferably less than or equal to 30 nM, preferably less than or equal to 29 nM, preferably less than or equal to 28 nM, preferably less than or equal to 27 nM, preferably less than or equal to 26 nM, preferably less than or equal to 25 nM, preferably less than or equal to 24.5 nM, preferably less than or equal to 24 nM. In a preferred embodiment, the sensor has a LOD for DA of 24 nM.

In some embodiments, the sensor has a linear detection range for DA spanning from 0.1 to 4000 micromolar ($\mu M$), preferably 0.5 to 3000 $\mu M$, preferably 0.5 to 2056 $\mu M$. In some embodiments, the sensor has a linear detection range for DA spanning from 0.5-2000 $\mu M$, preferably 0.5-1800 $\mu M$, preferably 0.5-1600 $\mu M$, preferably 0.5-1400 $\mu M$, preferably 0.5-1200 $\mu M$, preferably 0.5-1000 $\mu M$, preferably 0.5-800 $\mu M$, preferably 0.5-600 $\mu M$, preferably 0.5-500 $\mu M$. In a preferred embodiment, the sensor has a linear detection range for DA spanning from 0.5 to 2056 $\mu M$.

In some embodiments, the sensor may have a relative standard deviation (RSD) for detecting DA of less than or equal to 6%, preferably less than or equal to 5.5%, preferably less than or equal to 5%, preferably less than or equal to 4.5%, preferably less than or equal to 4%, and preferably less than or equal to 3%. In some embodiments, the sensor may have an RSD for detecting DA of less than or equal to 4.5%, preferably less than or equal to 4.4%, preferably less than or equal to 4.3%, preferably less than or equal to 4.2%, preferably less than or equal to 4.1%, and preferably less than or equal to 4%.

EXAMPLES

The following examples demonstrate a dopamine (DA) sensor including a glassy carbon electrode (GCE) including an indium oxide doped zinc oxide ($In_2O_3$-doped ZnO) decorated mesoporous carbon ($In_2O_3 \cdot ZnO@MC$) nanocomposite material. The examples are provided solely for illustration and are not to be construed as limitations of the present disclosure, as many variations thereof are possible without departing from the spirit and scope of the present disclosure.

Example 1: Materials and Methodology

All chemicals required for this disclosure were procured, including MC (with average pore diameter 100±10 angstrom (Å), pore volume 0.5 [cubic centimeter per gram (cm³/g), >99.95% trace metal basis]), DA, indium (III) nitrate, zinc nitrate [Zn(NO₃)₂], sodium hydroxide (NaOH), monosodium phosphate (NaH₂PO₄), disodium phosphate (Na₂HPO₄), sodium chloride (NaCl), uric acid (UA), glucose (Glc), and ascorbic acid (AA) from Sigma Aldrich, and used them as-received. All solutions used in the experiment were made with double-distilled water. The X-ray photoelectron spectroscopy (XPS) analysis of In₂O₃·ZnO@MC was carried out using a MgKα spectrometer (JEOL, JPS 9200) with the following parameters: pass energy=50 electron volt (eV) (wide-scan) and 30 eV (narrow-scan), Voltage=10 kilovolt (kV), Current=20 milliamperes (mA). Binding energies were calibrated considering C is =284.6 eV. XPS Peak 4.1 was used to deconvolute fine scan spectra with gaussian-Lorentzian function and Shirley's baseline. X-ray diffraction (XRD) spectra were recorded with a PANalytical X-ray diffractometer using Cu Kα1/2 radiation with λα1=154.060 p.m. and λα2=154.439 p.m. Raman spectra were acquired using a "Raman station 400 (PerkinElmer)" spectrometer. The surface morphology of the In₂O₃·ZnO@MC nanocomposite was investigated through field emission scanning electron microscopy (FESEM, JEOL-6300F, 5 kV), and elemental compositions were examined using energy dispersive X-ray spectroscopy (EDS, JEOL, Japan). Transmission electron microscopy (TEM) micrographs were obtained at 200 kV using a JEOL JEM-2100F-UHR field emission device equipped with a Gatan GIF 2001 energy filter and a 1 k-CCD camera. Electrochemical experiments were conducted with a Zahner Zennium potentiostat, a German made electrochemical analyzer.

Example 2: Synthesis of ZnO, In₂O₃, and In₂O₃·ZnO@MC Nanocomposite

The synthesis of the ZnO, In₂O₃, and In₂O₃·ZnO nanocomposites involved the following sequential steps. Initially, equimolar solutions of Zn(NO₃)₂ and In(NO₃)₃ were blended and stirred for 30 minutes (min) at 70 degree Celsius (° C.) in a beaker. Subsequently, NaOH was introduced into this mixture, and vigorous stirring was maintained at 80° C. for 8 hours (h). Herein, NaOH maintains the pH value at around 11 during the entire synthesis procedure. The resulting whitish precipitate was then subjected to thorough washing with distilled water and ethanol to eliminate any impurities, after which it was dried at 80° C. Following this, it underwent calcination by heating in a furnace for 5 h at 500° C. The chemical reactions occurring during this synthesis process are as follows:

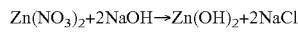
$$Zn(NO_3)_2 + 2NaOH \rightarrow Zn(OH)_2 + 2NaCl$$

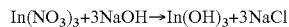
$$In(NO_3)_3 + 3NaOH \rightarrow In(OH)_3 + 3NaCl$$

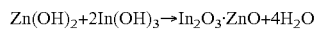
$$Zn(OH)_2 + 2In(OH)_3 \rightarrow In_2O_3 \cdot ZnO + 4H_2O$$

In this process, NaOH consistently generates OH⁻ ions, providing a stable pH throughout the procedure. The formation of Zn(OH)₂ nuclei occurs when the product of Zn²⁺ and OH⁻ ions surpasses the solubility product constant ($K_{sp}$) value. Correspondingly, In(OH)₃ was generated through a similar mechanism. Because of the similar ionic radii, In³⁺ ions may readily incorporate themselves into the ZnO lattice. Upon heating, the hydroxides decompose into the respective oxides. Pure In₂O₃ and ZnO nanoparticles (NPs) were synthesized using analogous methods. Ultimately, the In₂O₃·ZnO@MC nanocomposite was prepared using a straightforward sonication method. In a nutshell, 0.50 grams (g) of the calcined In₂O₃·ZnO and 50 milligrams (mg) of MC were thoroughly mixed before being dissolved in 80 milliliters (mL) distilled water. Following this, the mixture was sonicated for approximately 30 min under mild conditions. The resulting In₂O₃·ZnO@MC was acquired through decantation and subsequently dried at 60° C.

Example 3: Glassy Carbon Electrode (GCE) Modification Using In₂O₃·ZnO@MC Nanocomposite The GCEs underwent an initial cleaning process involving the use of 1 micrometer (μm) diamond and 0.5 μm alumina. Subsequently, the GCE was constructed by incorporating the In₂O₃·ZnO@MC nanocomposite with alcoholic Nafion. In the GCE fabrication procedure, 3.0 mg of In₂O₃·ZnO@MC was thoroughly mixed with 50 microliter (μL) of Nafion and 450 μL of isopropanol. Following this, 1.5 μL of this mixture was carefully applied on the GCE surface, then dried for 20 min at 60° C. resulting in the creation of the In₂O₃·ZnO@MC/GCE. Control experiments involving the fabrication of ZnO/GCE, In₂O₃/GCE, and MC/GCE followed the same procedures. Electrochemical investigations of DA (ranging from 0.5 μM to 10,000 μM) were performed using a standard three electrode electrochemical cell at room temperature in 0.1 M PBS (pH 7.0). In this configuration, the working electrode included In₂O₃·ZnO@MC/GCE, while a silver/silver chloride (Ag/AgCl) reference electrode and a platinum spiral electrode were employed as the reference and counter electrodes, respectively.

Figure 1C:
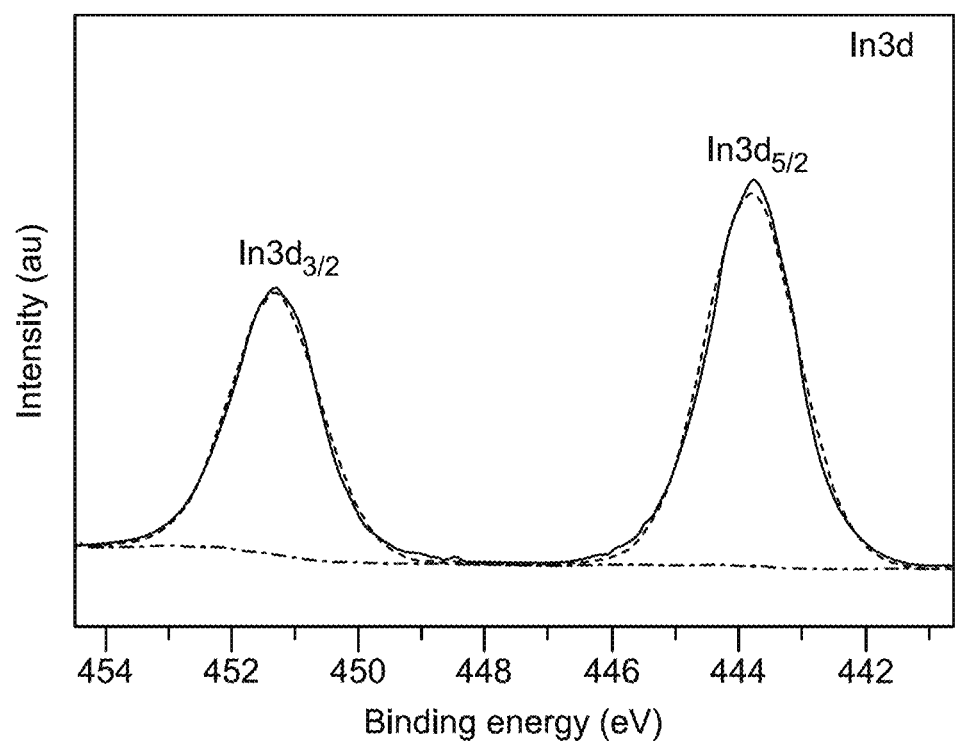
FIG. 1C is an XPS spectrum of In$_2$O$_3$·ZnO@MC nanocomposite for In 3d, according to certain embodiments.
Figure 1D:
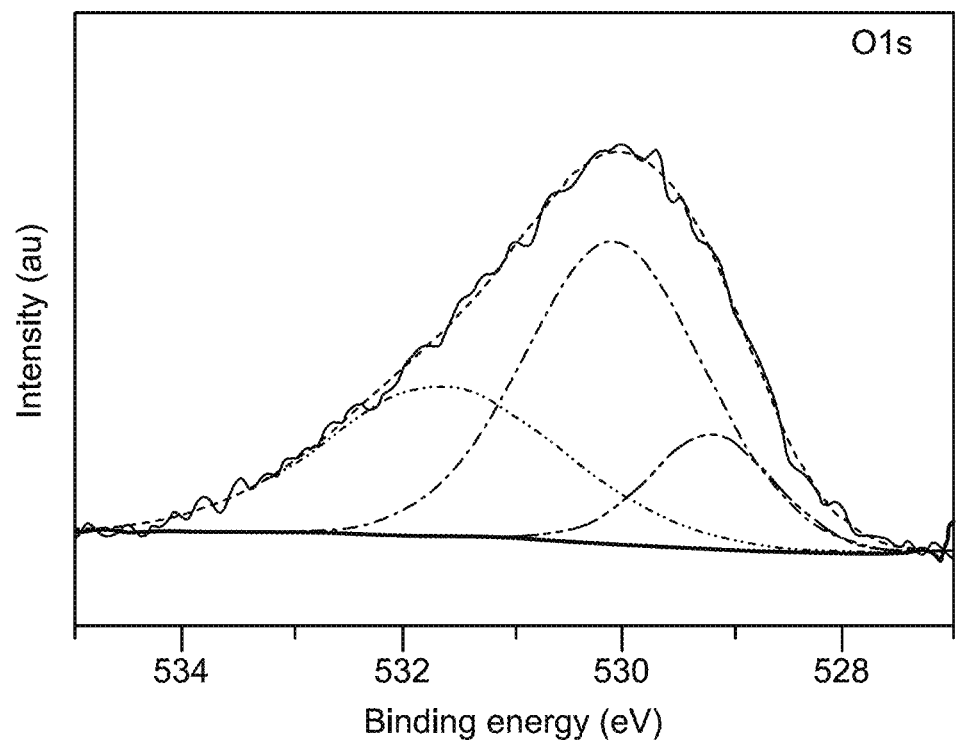
FIG. 1D is an XPS spectrum of In$_2$O$_3$·ZnO@MC nanocomposite for 0 is, according to certain embodiments.
Figure 1E:
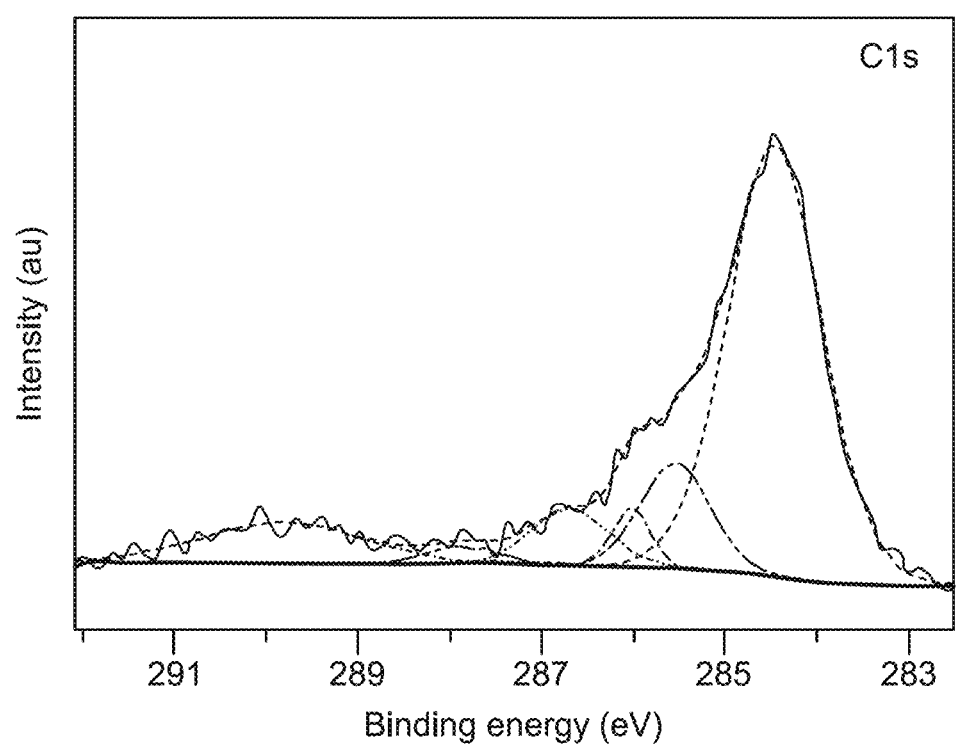
FIG. 1E is an XPS spectrum of In$_2$O$_3$·ZnO@MC nanocomposite for C 1s, according to certain embodiments.

The elemental composition and structural characteristics of In₂O₃·ZnO@MC were thoroughly examined through XPS investigation. XPS findings, as shown in FIG. 1A-1E, unequivocally reveal the presence of In, Zn, 0, and C atoms within the ZnO@MC In₂O₃·ZnO@MC nanocomposite. FIG. 1A is a survey spectrum for In₂O₃·ZnO@MC. In the deconvoluted Zn 2p spectrum FIG. 1B, two distinct peaks emerge at 1022.3 and 1045.2 electron volt (eV) that may be related to Zn 2p3/2 and Zn $2p_{1/2}$, respectively [Rahman M., et al., Fabrication of a hydrazine chemical sensor based on facile synthesis of doped NZO nanostructure materials, *New J. Chem.*, 2020, 44, 13018-13029, herein incorporated by reference in its entirety]. The peak separation between $Zn2p_{3/2}$ and $Zn2p_{1/2}$ is 22.9 eV, indicating 2+ oxidation state in In₂O₃·ZnO@MC nanocomposite. Meanwhile, the In 3d spectrum, as shown in FIG. 1C exhibits two discernible peaks at energy levels of 443.7 and 451.3 eV, corresponding to the characteristic spin-orbit In $3d_{5/2}$ and In $3d_{3/2}$ signals, respectively, and are consistent with the reported value of cubic In₂O₃ [Zatsepin D., et al., Bulk In₂O₃ crystals grown by chemical vapour transport: a combination of XPS and DFT studies, *J Mater Sci: Mater Electron*, 30, 18753-18758, 2019, herein incorporated by reference in its entirety]. In the C1s spectrum, as shown in FIG. 1D, three peaks are observed at 529.1 eV, 530.0 eV and 531.7 eV. The first two peaks are indicative of In—O and Zn—O bonds [Ahmed J., et al., Novel polypyrrole-carbon black doped ZnO nanocomposite for efficient amperometric detection of hydroquinone, Journal of Electroanalytical Chemistry, Volume 898, 2021, 115631, herein incorporated by reference in its entirety], while the third peak appeared as a shoulder peak at 531.7 eV may be assigned to O²⁻ ions in oxygen deficiency region or the adsorbed oxygen species [Akhmedov A., et al., The ZnO—In₂O₃ oxide system as a material for low-temperature deposition of transparent electrodes, Materials, 2021, 14, 6859, herein incorporated by reference in its entirety]. Additionally, the high-intensity fine scan XPS spectrum of C1s in FIG. 1E indicates the presence of carbon within the $In_2O_3 \cdot ZnO@MC$ nanocomposite. The deconvoluted C1s spectrum reveals six distinctive components: graphitic C $sp^2$ (peak at 284.4 eV), aliphatic or defect Carbon (peak at 285.2 eV), C—O from phenolic, alcohol, or ether group (peak at 286.0-286.6 eV), carbon in carbonyl group (peak at 287.6 eV), and carboxyl functional group (Peak at 289.2 eV) [Dongil A., et al., Surface chemical modifications induced on high surface area graphite and carbon nanofibers using different oxidation and functionalization treatments, *J Colloid Interface Sci.*, 2011, 355, 1, 179-89; Sanchez-Sanchez A., et al., Surface modification of nanocast ordered mesoporous carbons through a wet oxidation method, Carbon, 62, 2013, 193-203; Zhou J., et al., Characterization of surface oxygen complexes on carbon nanofibers by TPD, XPS and FT-IR, Carbon, 45, 4, 2007, pages 785-796; Chiang Y., et al., The influence of treatment duration on multi-walled carbon nanotubes functionalized by $H_2SO_4/HNO_3$ oxidation, Applied Surface Science, 257, 6, 2011, pages 2401-2410, each herein incorporated by reference in its entirety]. The atomic percentages of various elements present in $In_2O_3 \cdot ZnO@MC$ nanocomposite from the XPS data is shown in Table 1.

TABLE 1

Atomic percentages of various elements in $In_2O_3 \cdot ZnO@MC$ nanocomposite from XPS data.

| Name | Peak BE | FWHM/eV | Area (P)/CPS.eV | Atomic % |
|---|---|---|---|---|
| Zn2p | 1022.31 | 3.14 | 357979.1 | 32.48 |
| O1s | 531.28 | 3.89 | 162519.2 | 39.09 |
| In3d | 444.81 | 3.15 | 433871.3 | 19.19 |
| C1s | 285.21 | 3.41 | 58281.8 | 9.24 |

Figure 2A:
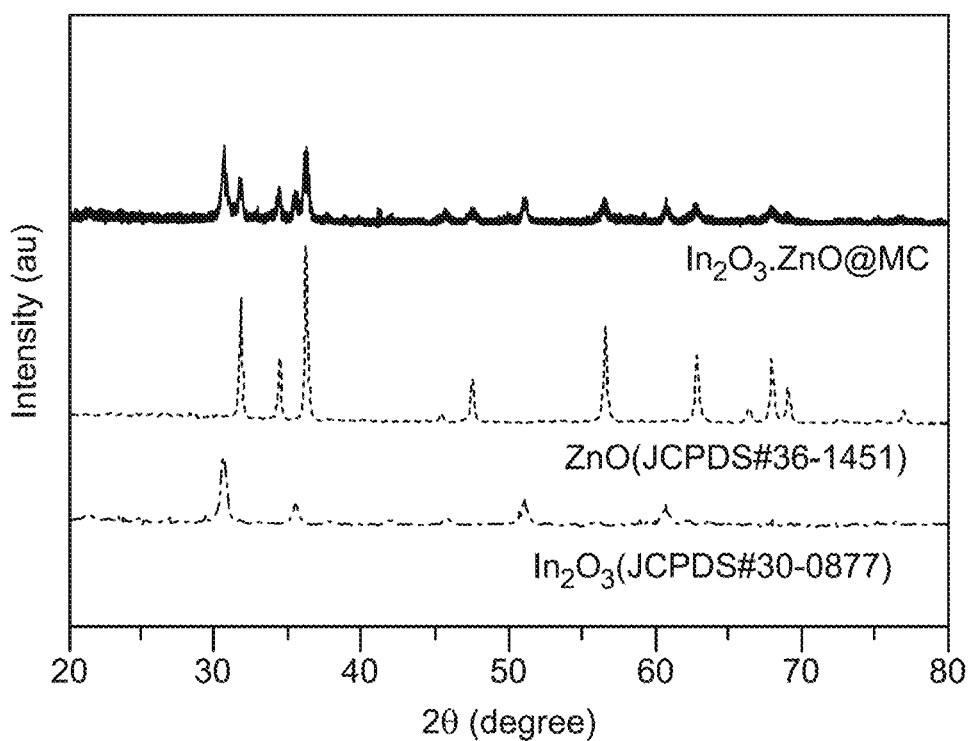
FIG. 2A depicts X-ray diffraction (XRD) patterns of indium oxide (In$_2$O$_3$), zinc oxide (ZnO), and In$_2$O$_3$·ZnO@MC nanocomposite, according to certain embodiments.
Figure 2B:
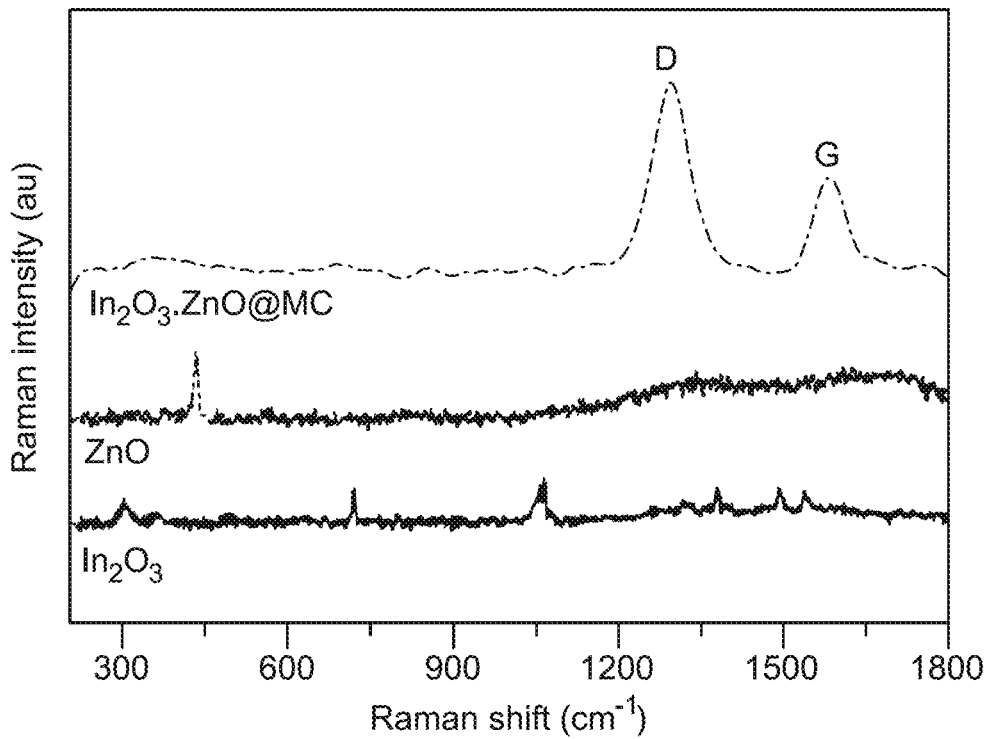
FIG. 2B depicts Raman spectra of In$_2$O$_3$, ZnO, and In$_2$O$_3$·ZnO@MC nanocomposite, according to certain embodiments.
Figure 3A:
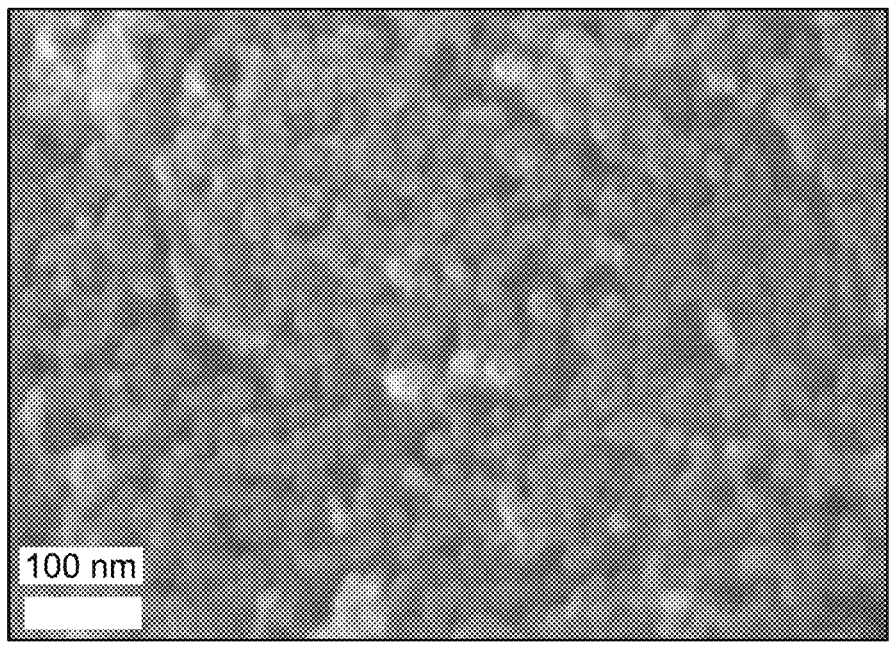
FIG. 3A depicts a field emission scanning electron microscope (FESEM) image of In$_2$O$_3$, according to certain embodiments.
Figure 3B:
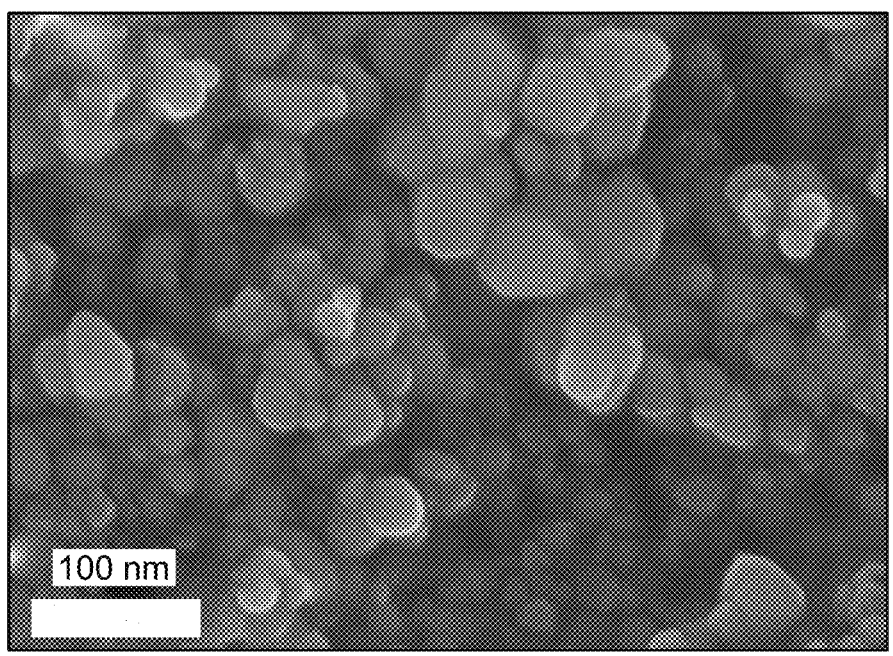
FIG. 3B depicts a FESEM image of ZnO, according to certain embodiments.
Figure 3C:
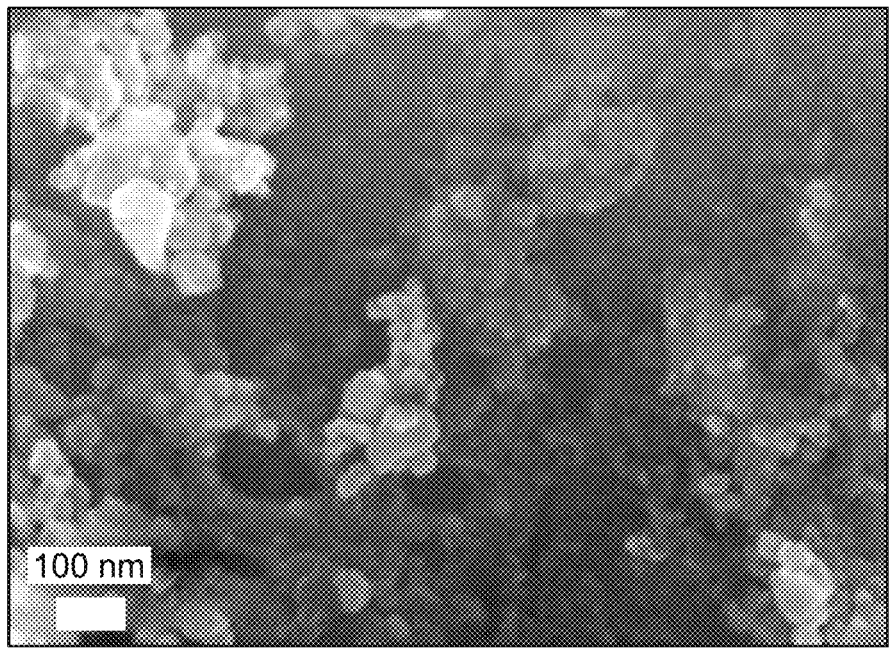
FIG. 3C depicts a FESEM image of In$_2$O$_3$·ZnO@MC nanocomposite, according to certain embodiments.
Figure 3D:
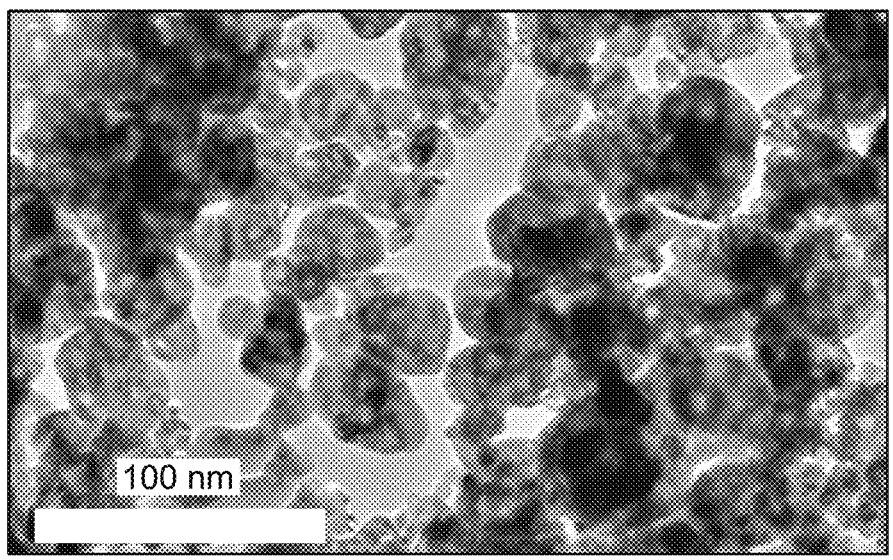
FIG. 3D depicts a transmission electron microscopy (TEM) of In$_2$O$_3$, according to certain embodiments.
Figure 3E:
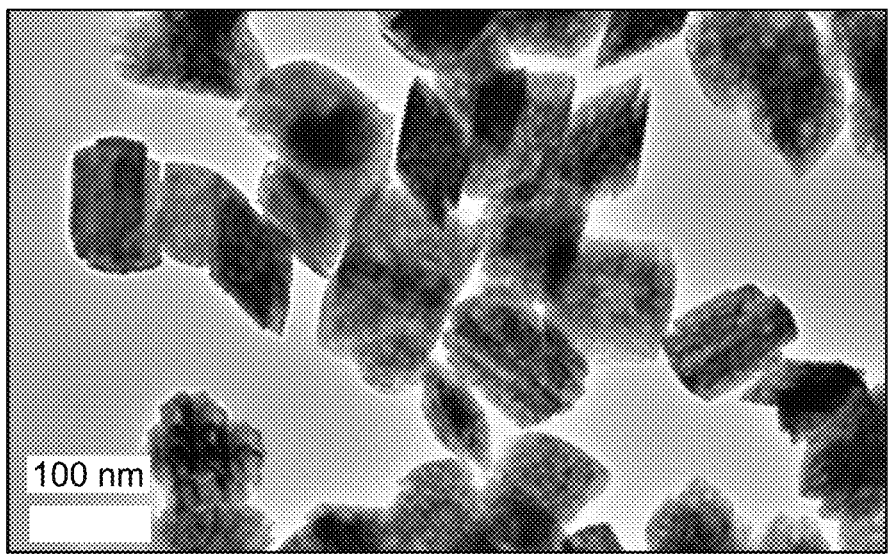
FIG. 3E depicts a TEM micrograph of ZnO, according to certain embodiments.
Figure 3F:
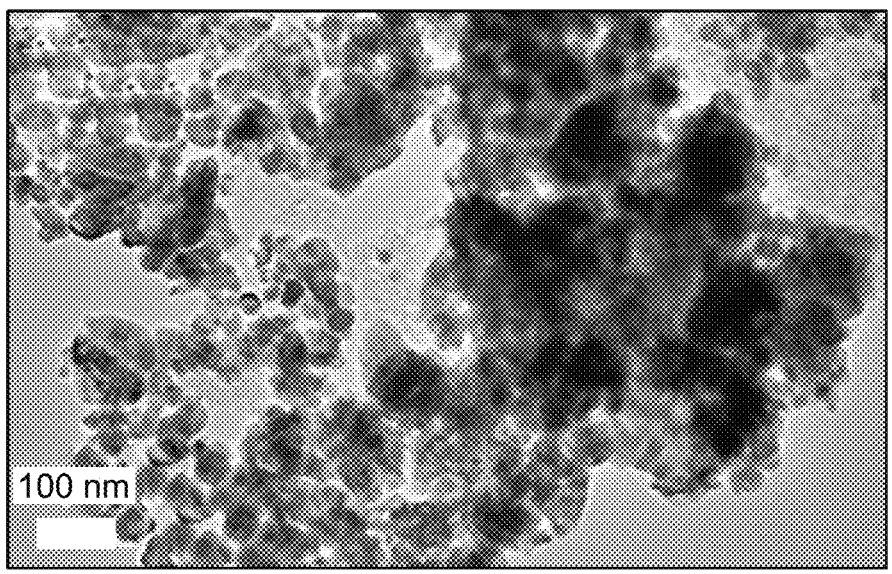
FIG. 3F depicts a TEM micrograph In$_2$O$_3$·ZnO@MC nanocomposite, according to certain embodiments.
Figure 3G:
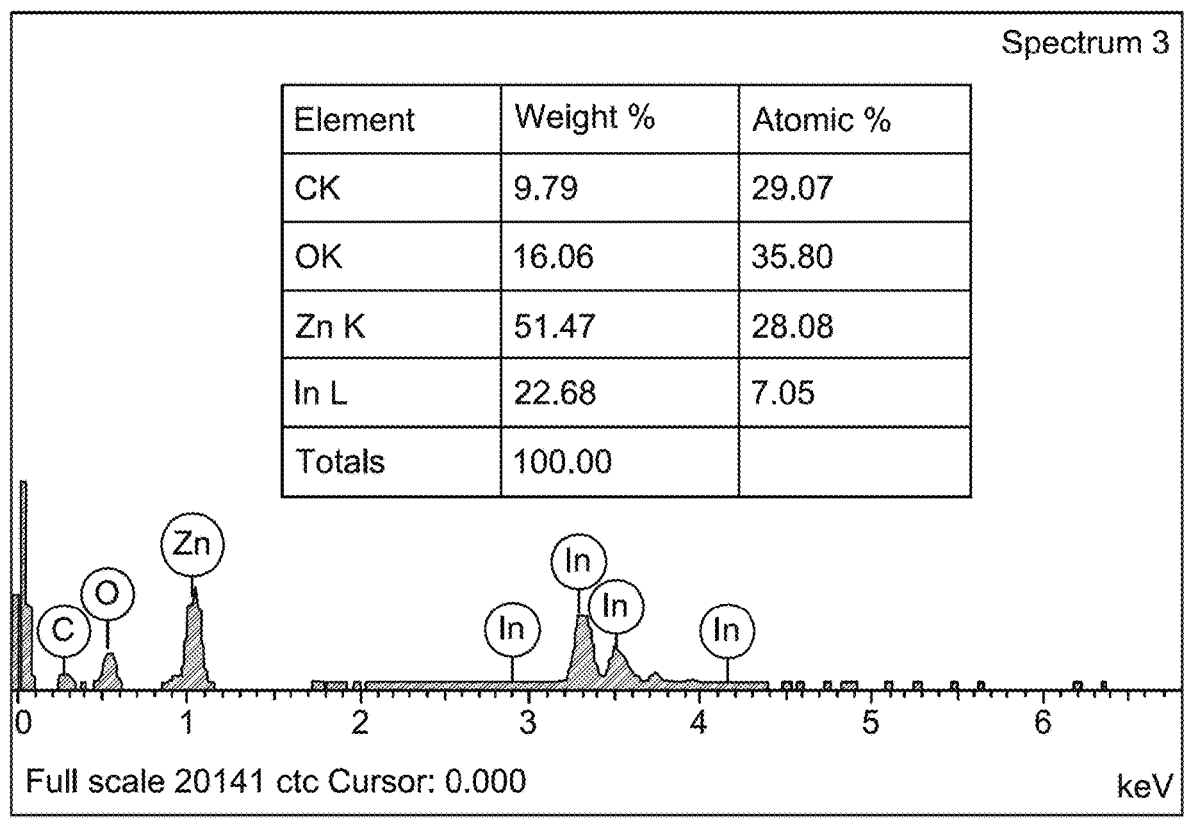
FIG. 3G depicts an energy-dispersive X-ray spectroscopy (EDS) spectrum of In$_2$O$_3$·ZnO@MC nanocomposite, according to certain embodiments.
Figure 3H:
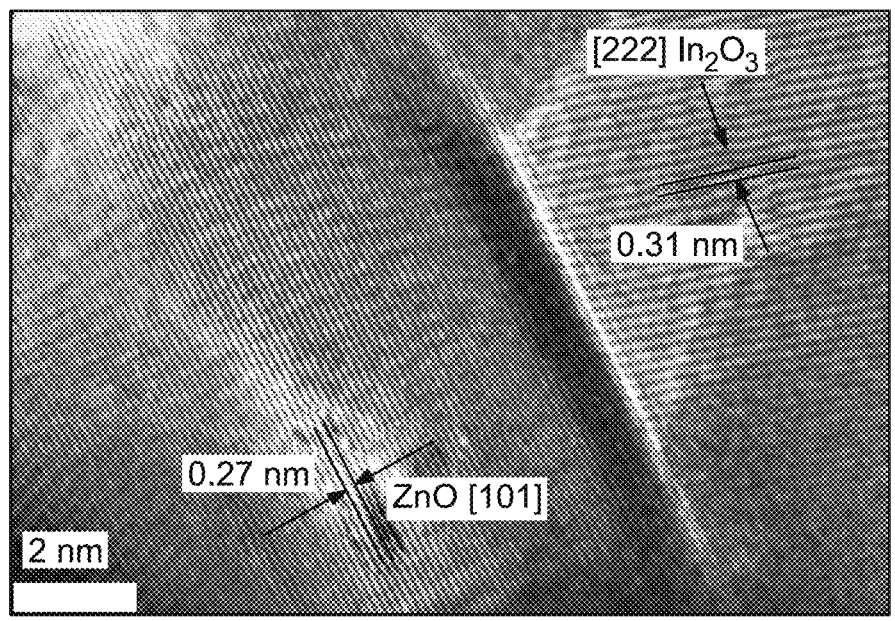
FIG. 3H depicts a high-resolution transmission electron microscopy (HR-TEM) image of In$_2$O$_3$·ZnO@MC nanocomposite showing the fringes of ZnO and In$_2$O$_3$, according to certain embodiments.
Figure 3I:
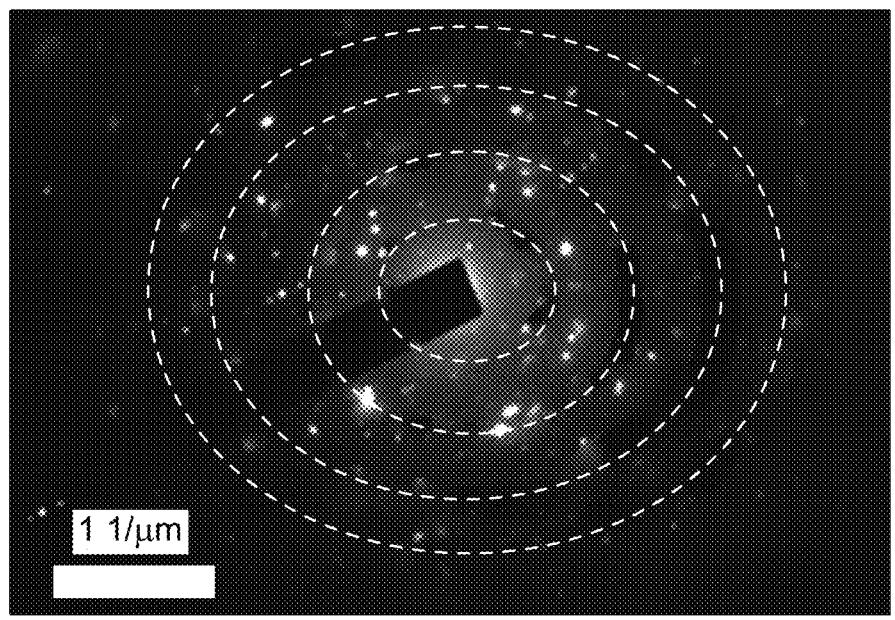
FIG. 3I depicts selected area electron diffraction (SAED) patterns of In$_2$O$_3$·ZnO@MC nanocomposite, according to certain embodiments.

In XRD patterns presented in FIG. 2A, distinct diffraction peaks are evident at 2θ values of 31.6°, 34.3°, 36.2°, 50.1°, 56.5°, 62.7°, 66.3°, 67.9°, and 68.9°. These peaks may be directly linked to the single crystalline hexagonal wurtzite-phased ZnO NPs (100), (002), (101), (102), (110), (103), (200), (112), and (201) planes (UCPDS #36-1451), respectively [Rahman M., et al., Fabrication of a hydrazine chemical sensor based on facile synthesis of doped NZO nanostructure materials, *New J. Chem.*, 2020, 44, 13018-13029, herein incorporated by reference in its entirety]. Simultaneously, the presence of diffraction bands at 30.5°, 35.5°, 51.1°, and 60.8° is associated with the (222), (400), (440), and (622) planes of $In_2O_3$ NPs (J C PDS #30-0877) [Ning Q., et al., Synthesis of A Novel $In_2O_3$—InN Bottle nanotube using in-situ partial oxidation with enhanced gas sensing platform to detect $NO_2$, *Crystals*, 2020, 10, 570, herein incorporated by reference in its entirety]. However, the XRD spectrum of the $In_2O_3 \cdot ZnO@MC$ nanocomposite does not prominently feature a broad peak at approximately 2θ=24.3° due to the relatively low abundance of MC. FIG. 2B depicts Raman spectra of $In_2O_3$, ZnO, and $In_2O_3 \cdot ZnO@MC$ nanocomposite. The Raman spectra reveal characteristic bands at 303.5 $cm^{-1}$, 722.3 $cm^{-1}$, 1059.2 $cm^{-1}$, and 1377.9 $cm^{-1}$, which may be linked to $In_2O_3$. Additionally, bands at 432.3 $cm^{-1}$ are indicative of ZnO [Zhuo R., et al., Morphology-controlled synthesis, growth mechanism, optical and microwave absorption properties of ZnO nanocombs, *Phys. D: Appl. Phys.*, 41, 185405; Ullah H. Study of the optical and gas sensing properties of $In_2O_3$ nanoparticles synthesized by rapid sonochemical method, *J Mater Sci: Mater Electron*, 31, 17474-17481, 2020, each herein incorporated by reference in its entirety]. Notably, the Raman spectrum of the $In_2O_3 \cdot ZnO@MC$ nanocomposite displays both $In_2O_3$ and ZnO peaks, with slight shifts confirming the formation of the composite. Furthermore, the Raman spectrum of $In_2O_3 \cdot ZnO@MC$ nanocomposite clearly shows that the D band (1297 $cm^{-1}$) and G band (1585 $cm^{-1}$) of MC are present, further substantiating the inclusion of MC in the composite [Ahmed J. et al., Faisal M, Harraz F A, Jalalah M, Alsareii S A. Porous silicon-mesoporous carbon nanocomposite based electrochemical sensor for sensitive and selective detection of ascorbic acid in real samples, *Journal of the Taiwan Institute of Chemical Engineers*, Volume 125, 2021, pages 360-371, herein incorporated by reference in its entirety]. The morphology and surface structure of ZnO, $In_2O_3$, and the $In_2O_3 \cdot ZnO@MC$ nanocomposite were scrutinized using FESEM, as depicted in FIG. 3A-3C. FIG. 3A-3B present images of pure $In_2O_3$ and ZnO, respectively. In contrast, FIG. 3C exhibits the $In_2O_3 \cdot ZnO@MC$ nanocomposite, revealing the dispersion of $In_2O_3 \cdot ZnO$ NPs across the surface of MC. For a more comprehensive examination of the morphology, TEM was utilized to showcase clusters of spherical $In_2O_3$ and cubic ZnO NPs, as shown in FIGS. 3D-3F. These images provide a detailed view of the structural characteristics of ZnO, $In_2O_3$, and the $In_2O_3 \cdot ZnO@MC$ nanocomposite. Elemental composition analysis was conducted using EDS for the $In_2O_3 \cdot ZnO@MC$ nanocomposite, as displayed in FIG. 3G. According to the EDS results, the nanocomposite includes Zn, In, O, and C, constituting 51.47%, 22.68%, 16.06%, and 9.79% of the weight of the composite, respectively. These findings align with the results obtained from XPS and XRD analyses. Furthermore, FIG. 3H showcases a high-resolution transmission electron microscopy (HR-TEM) image of $In_2O_3 \cdot ZnO@MC$ nanocomposite. In FIG. 3I. The selected area electron diffraction (SA ED) patterns clearly depict the polycrystalline nature of the $In_2O_3 \cdot ZnO@MC$ nanocomposite.

Figure 4A:
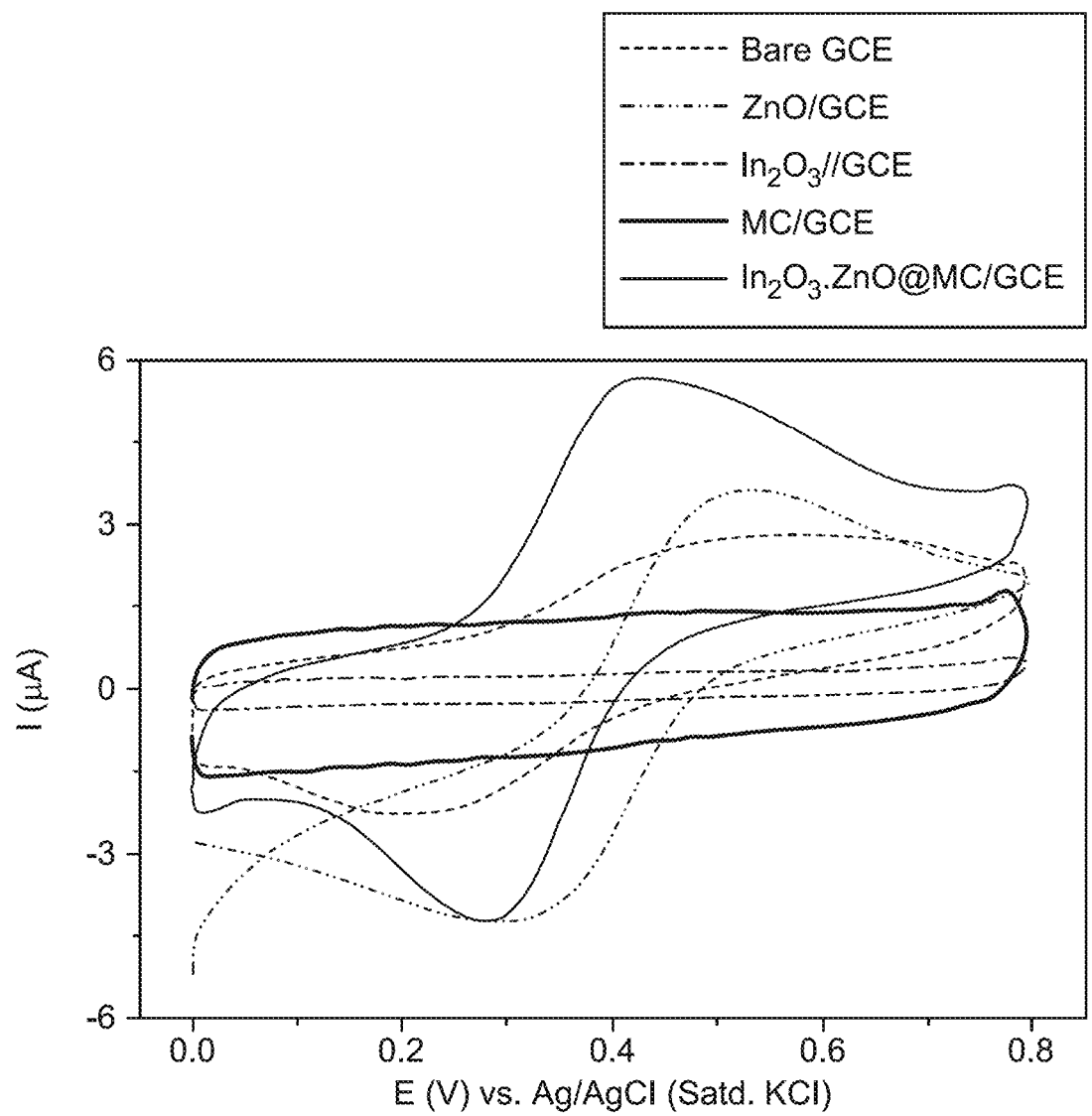
FIG. 4A depicts cyclic voltammetry (CV) responses recorded in 0.1 M phosphate-buffered saline (PBS) (pH 7.0) at a scan rate of 0.05 volts per second (V/s) from bare glassy carbon electrode (GCE), ZnO decorated GCE (ZnO/GCE), In$_2$O$_3$ decorated GCE (In$_2$O$_3$/GCE), mesoporous carbon decorated GCE (MC/GCE), and GCE modified In$_2$O$_3$·ZnO@MC (In$_2$O$_3$·ZnO@MC/GCE), each with 100 micromolar ($\mu M$) dopamine (DA), according to certain embodiments.
Figure 4B:
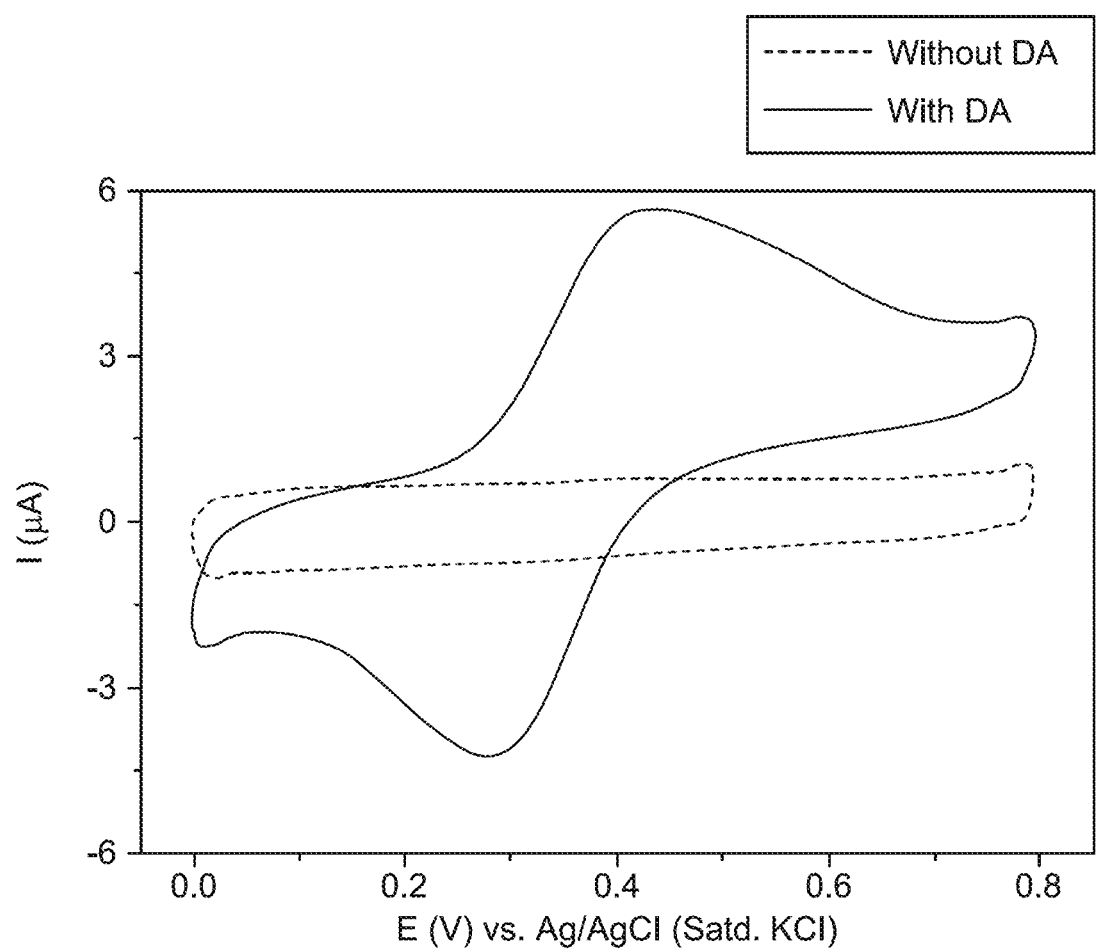
FIG. 4B depicts CV responses recorded in 0.1 M PBS (pH 7.0) at a scan rate of 0.05 V/s from In$_2$O$_3$·ZnO@MC/GCE, both in the presence and absence of DA, according to certain embodiments.
Figure 4C:
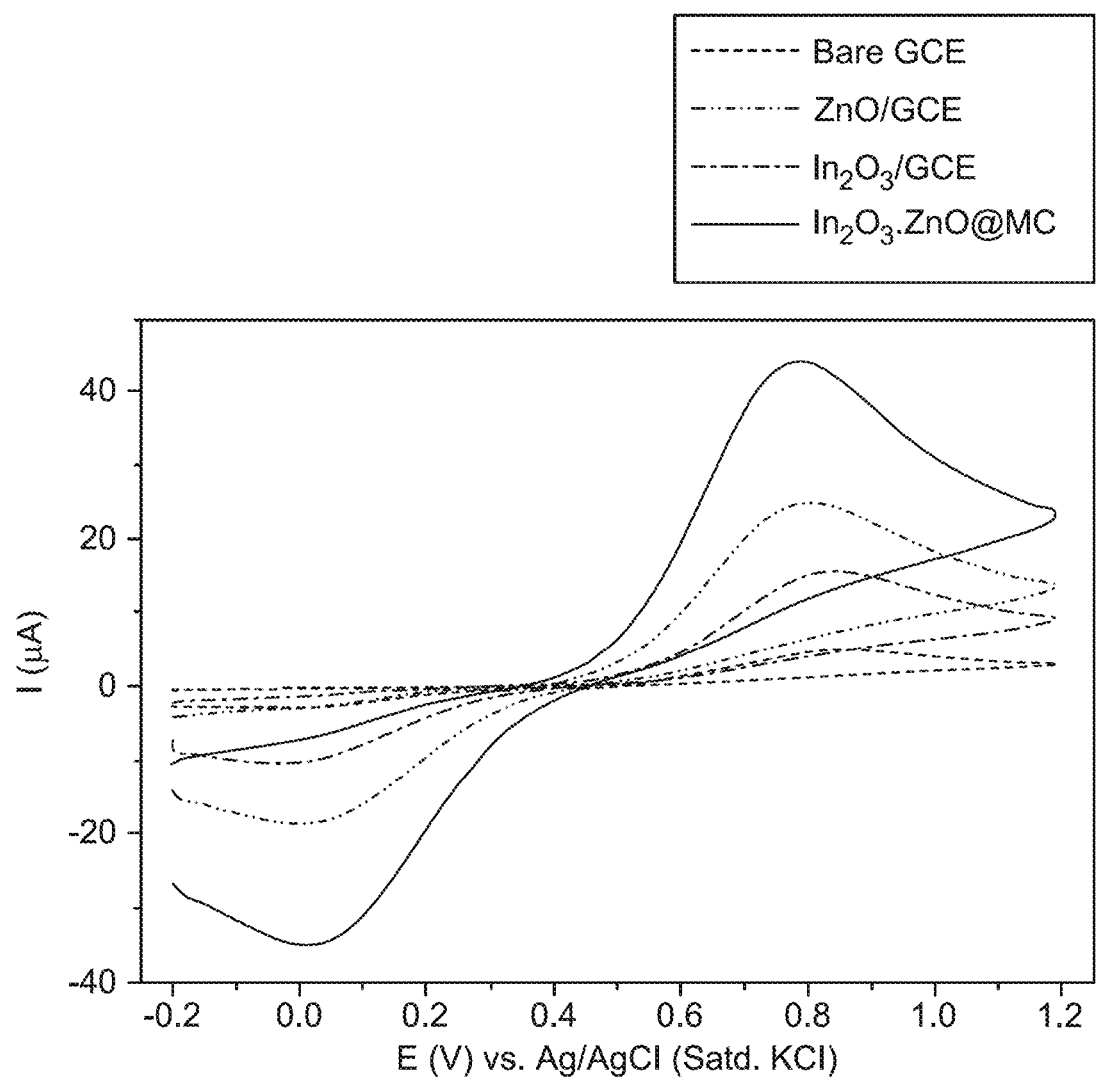
FIG. 4C depicts CV responses recorded in 1.0 millimolar (mM) ferricyanide/ferrocyanide ([Fe(C N)$_6$]$^{3-/4-}$) in 0.1 molar (M) potassium chloride (KCl) at a scan rate of 0.05 V/s using bare GCE, ZnO/GCE, In$_2$O$_3$/GCE, and In$_2$O$_3$·ZnO@MC/GCE, according to certain embodiments.
Figure 5A:
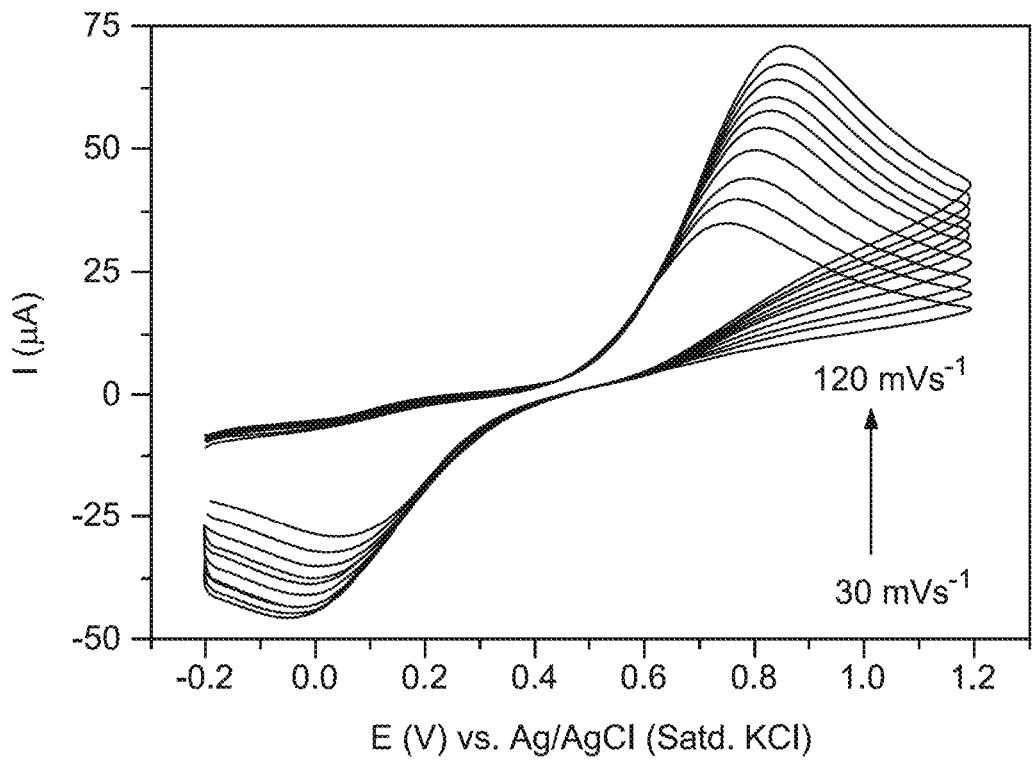
FIG. 5A depicts CVs recorded with 1 mM [Fe(CN)$_6$]$^{3-/4-}$ in 0.1 M KCl using the In$_2$O$_3$·ZnO@MC/GCE assembly for scan rates ranging from 30 millivolts per second (mV/s) to 120 mV/s, according to certain embodiments.
Figure 5B:
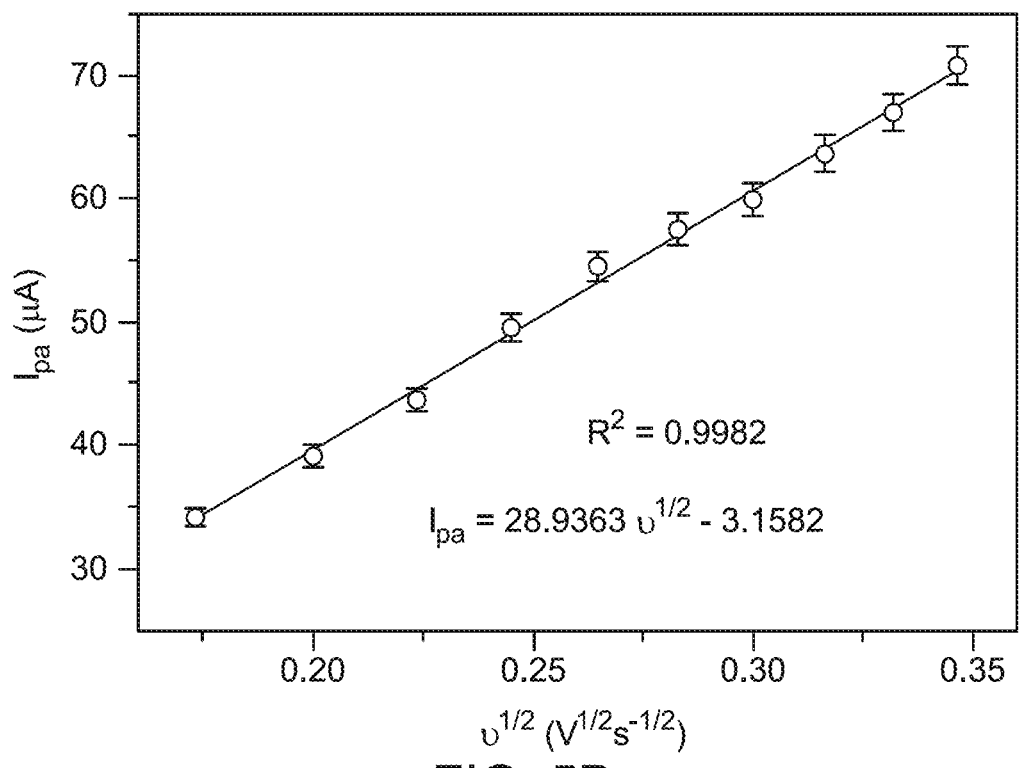
FIG. 5B depicts a peak current ($I_{pa}$) vs. square root of sweep rate ($v^{1/2}$) plot using the In$_2$O$_3$·ZnO@MC/GCE, according to certain embodiments.

Electrochemical investigation of $In_2O_3 \cdot ZnO@MC/GCE$ assembly Cyclic voltammetry (CV) and electrochemical impedance spectroscopy (EIS) were used to assess and improve the electrochemical performance of fabricated electrodes. In FIG. 4A, when exposed to 100 μM DA, the bare GCE displayed a weak CV response at +0.58 volt (V). In contrast, the ZnO/GCE exhibited an enhanced CV response at +0.53 V, while the $In_2O_3$/GCE and MC/GCE yielded no discernible CV response. Interestingly, the $In_2O_3 \cdot ZnO@MC/GCE$ demonstrated a noticeably enhanced CV response, roughly double that of the bare GCE, and this improvement was achieved at a substantially lower potential of +0.45 V. This observation underscores the enhanced electrocatalytic performance of the $In_2O_3 \cdot ZnO@MC/GCE$ assembly in DA detection when compared to the other electrodes including bare GCE, ZnO/GCE, $In_2O_3$/GCE, and MC/GCE as presented in FIG. 4A. Consequently, the $In_2O_3 \cdot ZnO@MC/GCE$ combination is designated as a DA sensor. Furthermore, as depicted in FIG. 4B, the $In_2O_3 \cdot ZnO@MC/GCE$ sensor presented a clear CV peak when subjected to 100 μM DA, while in PBS without DA showed no such peak. This underscores the efficient electrochemical capabilities of the sensor in DA detection. FIG. 4C showed the CV responses recorded in 1.0 millimolar (mM) ferricyanide/ferrocyanide ($[Fe(CN)_6]^{3-/4-}$) in 0.1 M potassium chloride (KCl) at a scan rate of 0.05 volt per second (V/s) using bare GCE, ZnO/GCE, $In_2O_3$/GCE, and $In_2O_3 \cdot ZnO@MC/GCE$, and clearly demonstrated that the $In_2O_3 \cdot ZnO@MC/GCE$ had the best electrocatalytic activity in terms of peak position, intensity and peak shape. CVs for 1 mM $[Fe(CN)_6]^{3-/4-}$ in 0.1 M KCl using the $In_2O_3 \cdot ZnO@MC/GCE$ assembly for scan rates ranging from 30 to 120 mV/s was calculated, as shown in FIG. 5A. From the slope ($2.8936 \times 10^{-5}$ $AV^{-1/2}s^{1/2}$) of the $I_{pa}$ vs. $v^{1/2}$ plot, as shown in FIG. 5B, using the Randles-Sevcik equation, $I_{pa} = (2.69 \times 10^5) n^{3/2} A_{eff} D^{1/2} C_o v^{1/2}$, Equation (1) is derived:

$$2.8936 \times 10^{-5} = (2.69 \times 10^5) n^{3/2} A_{eff} D^{1/2} C_o \quad (1)$$

In the above equation, using respective values as stated in the disclosure, mentioned here again as n=1 is the stoichiometric electron number in this electrode reaction, $A_{eff}$ represents the electrode area in $cm^2$, $D = 7.6 \times 10^{-6}$ $cm^2 s^{-1}$ represents diffusion-coefficient of $[Fe(CN)_6]^{3-/4-}$, $C_o = 1 \times 10^{-6}$ $molcm^{-3}$ is the $[Fe(CN)_6]^{3-/4-}$ solution concentration. Accordingly, effective surface area of the modified electrode was calculated as per Equation (2):

$$A_{eff} = (2.8936 \times 10^{-5})/[2.69 \times 10^5 \times 1^{3/2} \times (7.6 \times 10^{-6})^{1/2} \times (1.0 \times 10^{-6})] = 0.0390 \, cm^2 \quad (2)$$

Similarly, the effective surface area of a bare GCE was calculated.

Figure 4D:
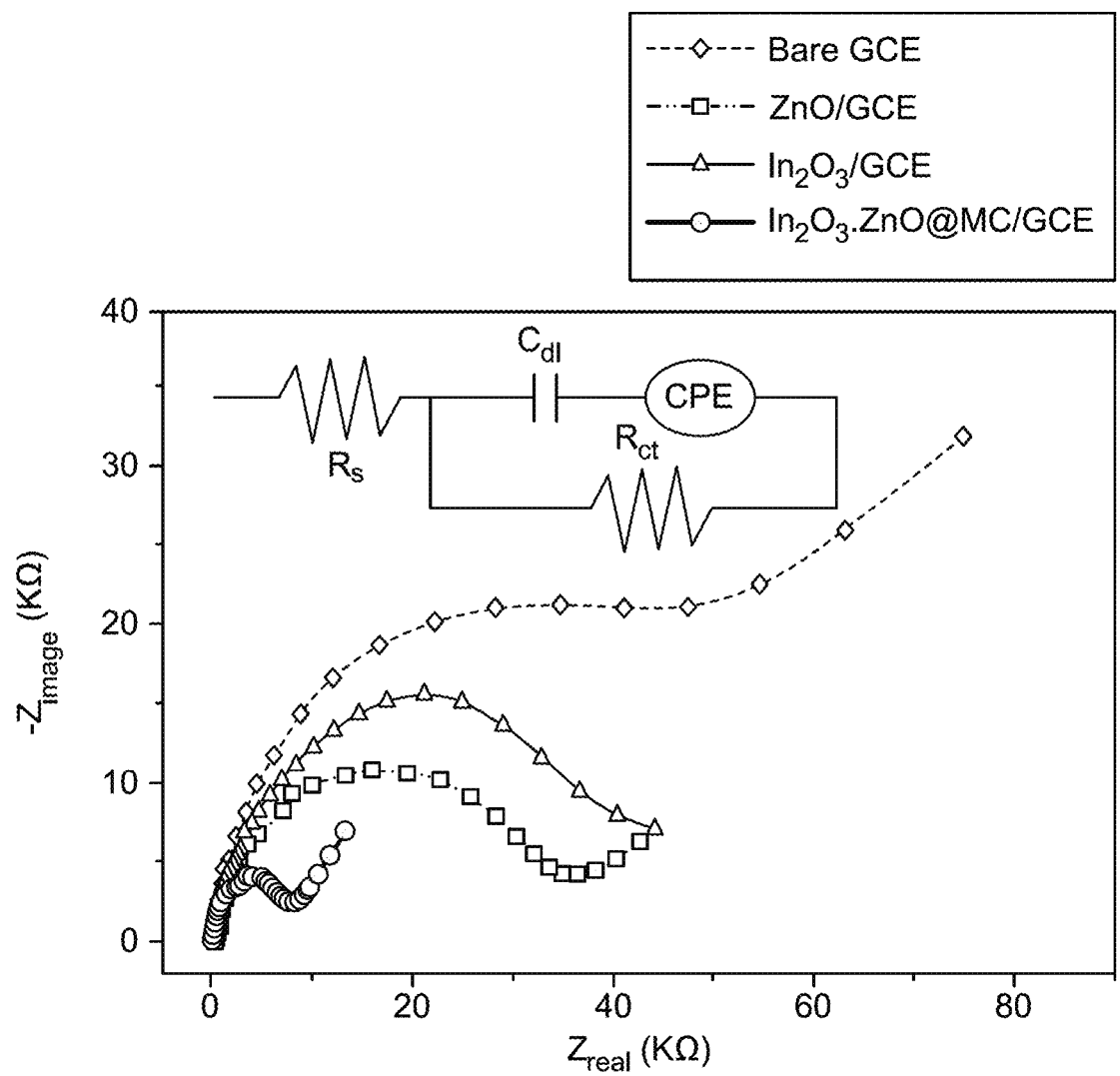
FIG. 4D depicts electrochemical impedance spectroscopy (EIS) Nyquist plots using different electrodes in a solution of 1.0 mM [Fe(C N)$_6$]$^{3-/4-}$ in 0.1 M KCl at +0.50 V, with signal amplitudes set at 10 millivolt (mV) and frequencies ranging from 0.1 hertz (Hz) to 100 kilohertz (kHz), according to certain embodiments.
Figure 6A:
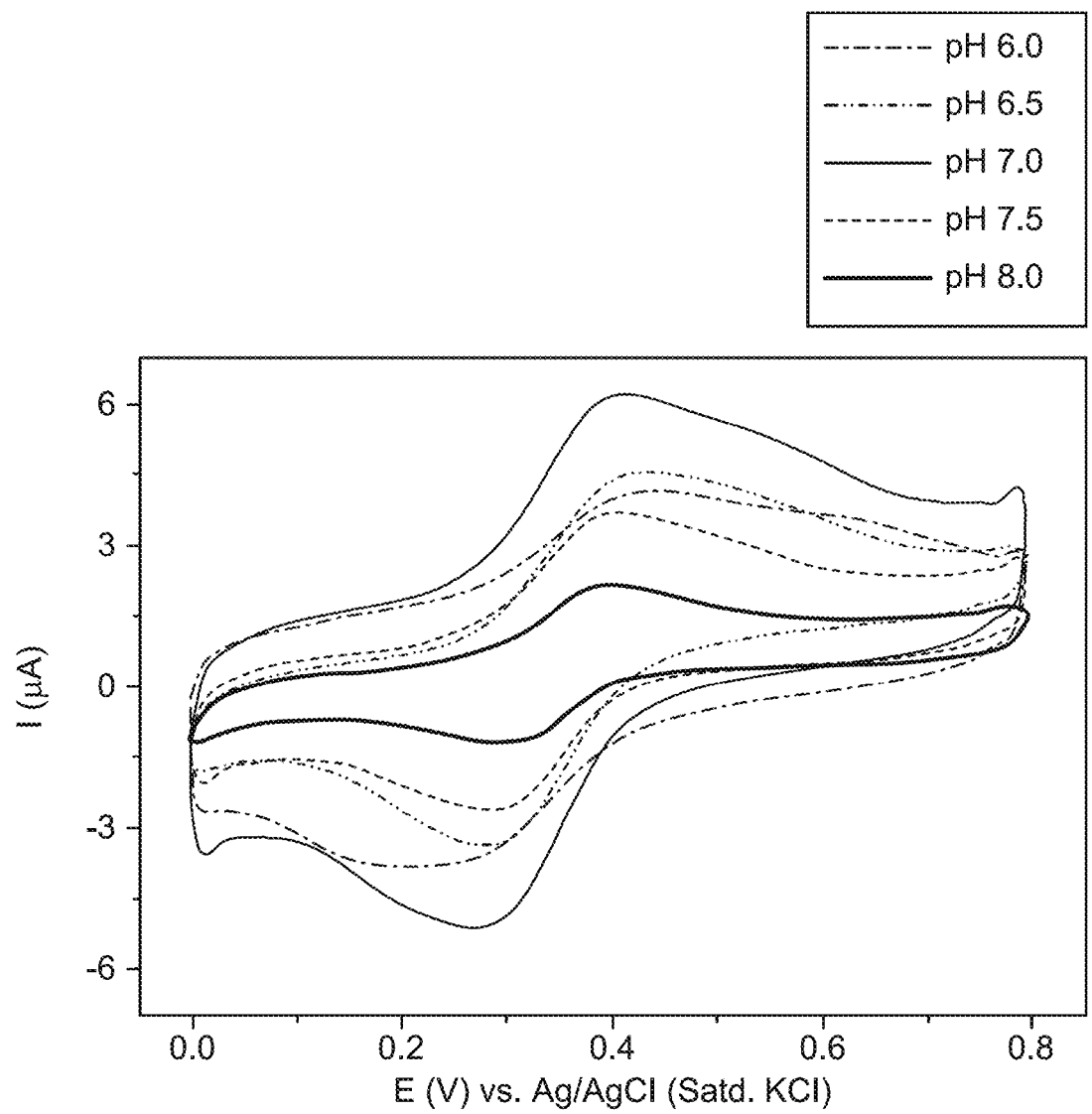
FIG. 6A depicts CVs recorded with 100 µM DA in 0.1 M PBS at different pH (6.0-8.0), according to certain embodiments.
Figure 6B:
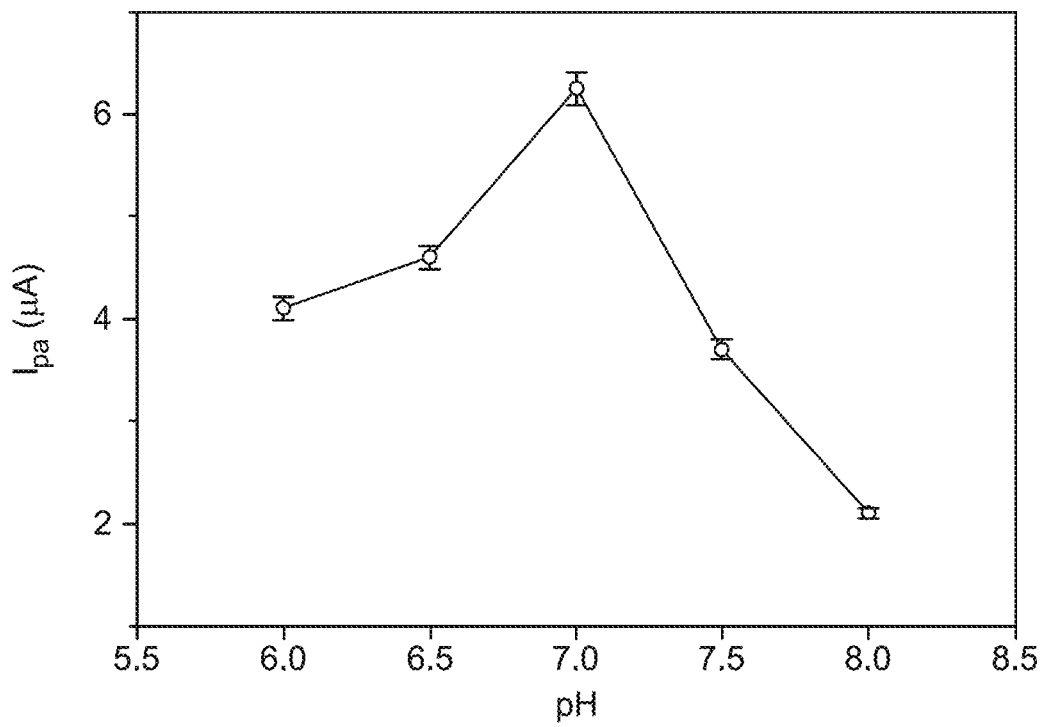
FIG. 6B depicts plot of $I_{pa}$ vs. pH, according to certain embodiments.
Figure 6C:
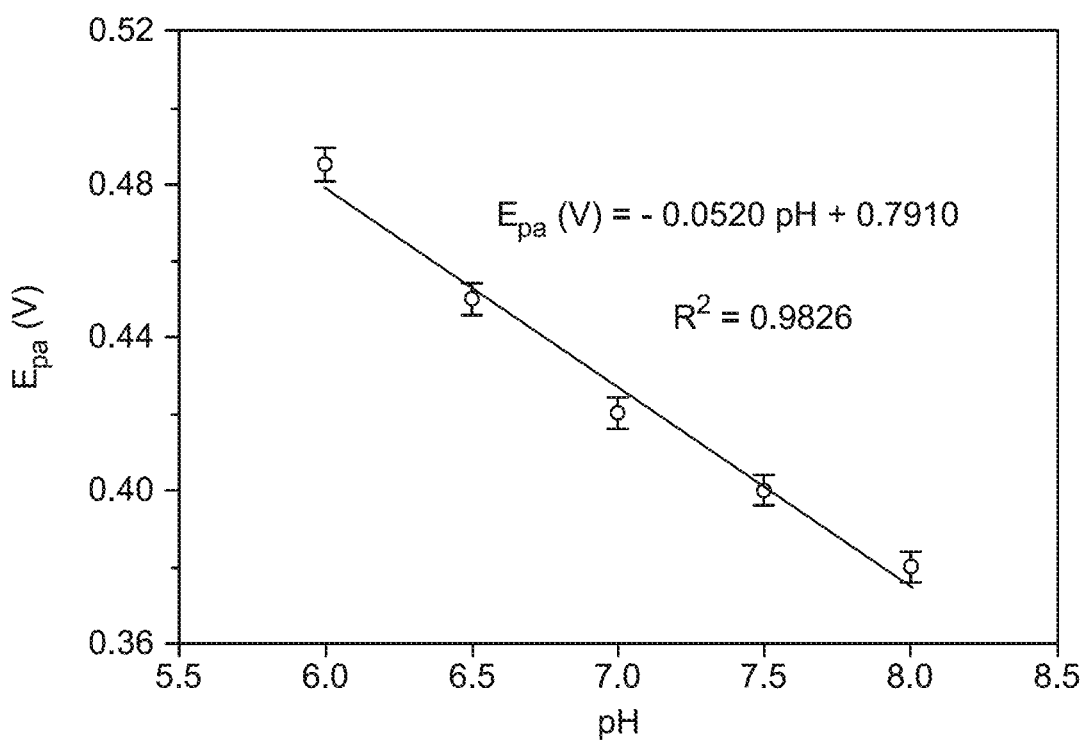
FIG. 6C depicts plot of peak potential ($E_{pa}$) vs. pH, according to certain embodiments.

Moving to FIG. 4D, the Nyquist plots from electrochemical impedance spectroscopy (EIS) measurements for the bare GCE, $In_2O_3$/GCE, ZnO/GCE, and $In_2O_3 \cdot ZnO@MC$/GCE are presented. The inset diagram depicts the associated equivalent circuit. Notably, the semicircle diameter of the $In_2O_3 \cdot ZnO@MC$/GCE assembly was the smallest, indicating a lower charge transfer resistance ($R_{ct}$) value of 12.5 kilo-ohm (kΩ) compared to bare GCE (75.2 kΩ) or ZnO/GCE (41.4 kΩ) or $In_2O_3$/GCE (57.4 kΩ). These $R_{ct}$ values were estimated by fitting the data using the EIS spectrum analyzer software. Such a reduced semicircular diameter of $In_2O_3 \cdot ZnO@MC$/GCE electrode suggests that the modification has effectively decreased its Ret. Considering the findings, it is evident that the $In_2O_3 \cdot ZnO@MC$/GCE assembly demonstrates enhanced electron-transfer performance when compared to the other electrodes presented in FIG. 4A. To examine how pH affects the electrochemical oxidation of DA, experiments were conducted across a pH range of 6.0-8.0, utilizing a 100 μM DA solution. As illustrated in FIG. 6A-6B, the peak current ($I_{pa}$) displayed a steady rise within the pH range of 6.0-7.0, followed by a decline within the pH range of 7.0-8.0. In FIG. 6B, the highest $I_{pa}$ value was witnessed at pH 7.0. Consequently, pH 7.0 was selected as the reference pH for subsequent experiments in this study. FIG. 6C portrays a linear correlation between the peak potential ($E_{pa}$) and pH, as described by the following regression Equation (3).

$$E_{pa}(V) = 0.7910 - 0.0520 \, pH \, (R^2 = 0.9826) \quad (3)$$

The recorded slope of −52 mV per pH unit within the defined pH range, as illustrated in FIG. 6C, closely corresponds to the theoretical value of −59. This alignment suggests an equilibrium point where an equal number of protons and electrons are involved in the oxidation process of DA [Ahmed J. et al., Porous silicon-mesoporous carbon nanocomposite based electrochemical sensor for sensitive and selective detection of ascorbic acid in real samples, *Journal of the Taiwan Institute of Chemical Engineers*, Volume 125, 2021, pages 360-371, herein incorporated by reference in its entirety].

Figure 7A:
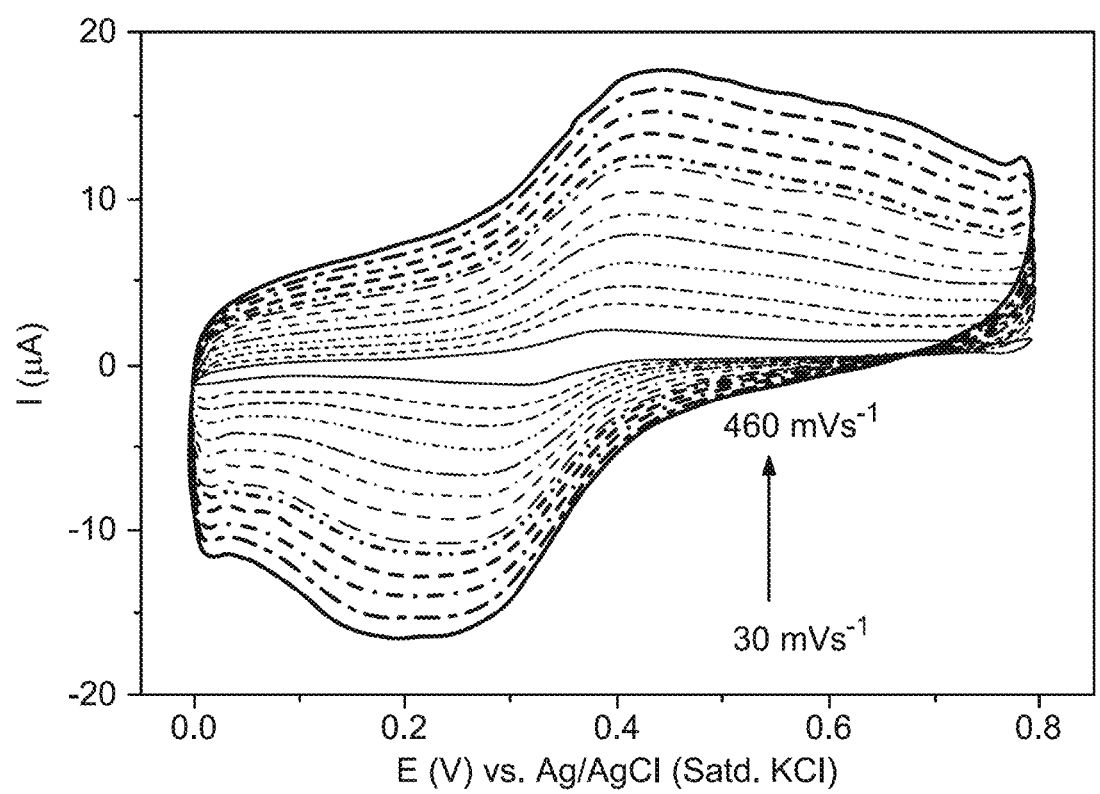
FIG. 7A depicts CVs recorded at varying scan rates (30-460 mV/s) with 100 µM DA in 0.1 M PBS, according to certain embodiments.
Figure 7B:
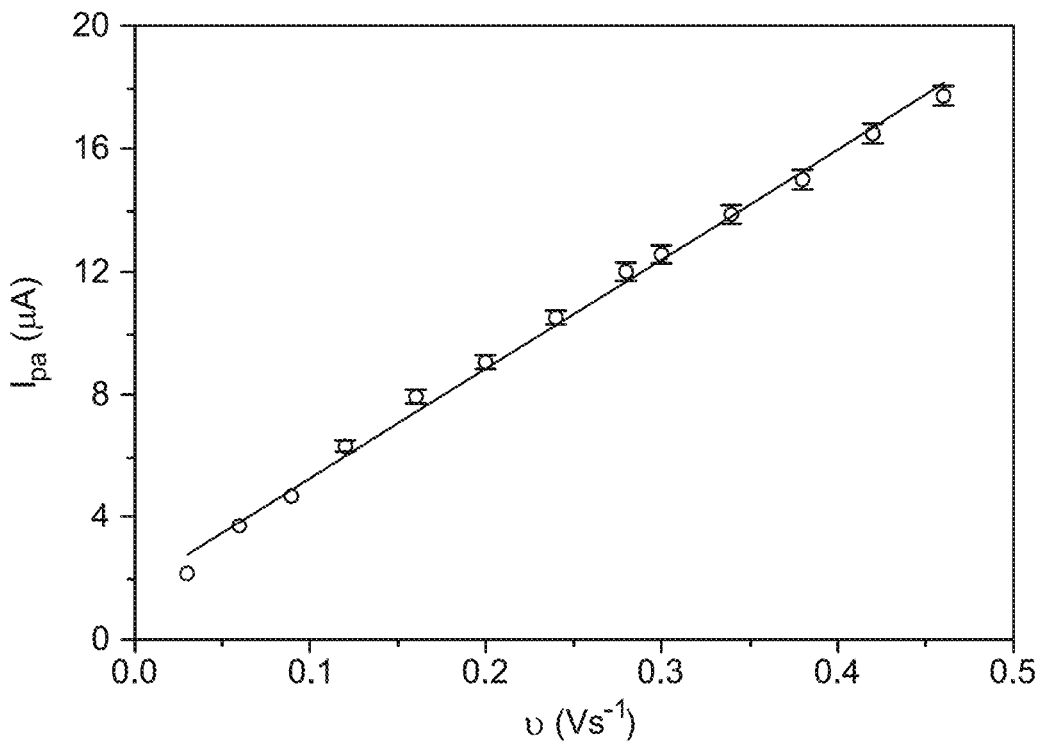
FIG. 7B depicts a linear plot of $I_{pa}$ vs. sweep rate ($v$), according to certain embodiments.
Figure 7C:
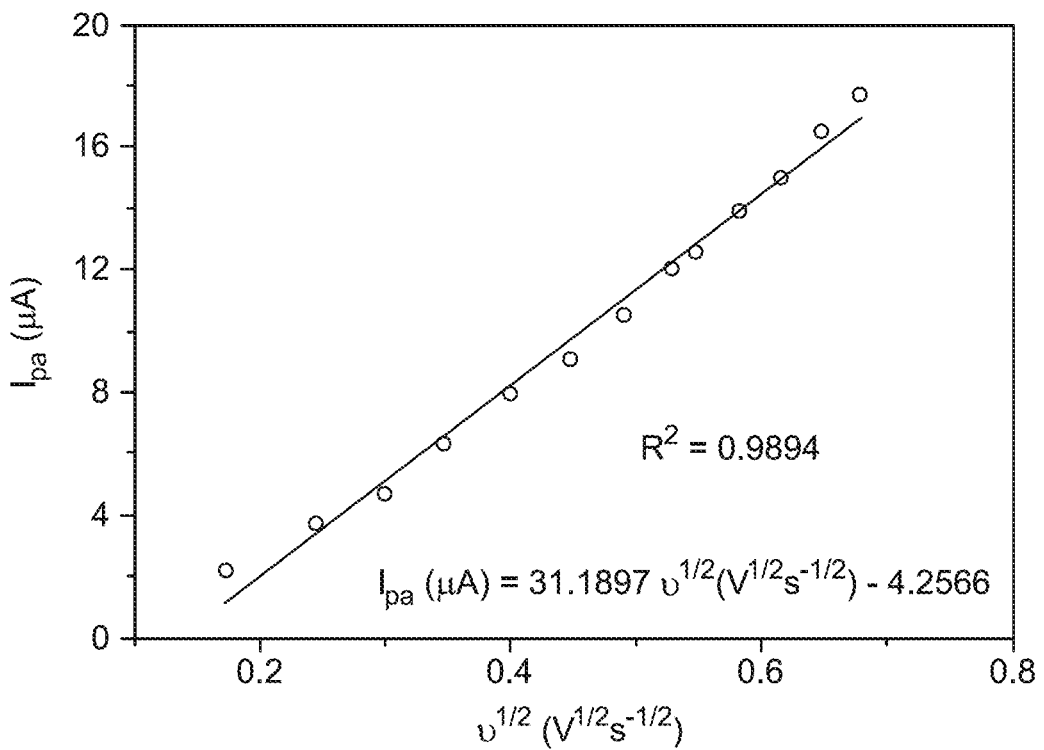
FIG. 7C depicts a linear plot of $I_{pa}$ vs. $\sqrt{v}$, according to certain embodiments.

The investigation of scan rate (n), as illustrated in FIG. 7A, presents CVs acquired utilizing a $In_2O_3ZnO@MC$/GCE assembly with varying scan rates ranging from 30 millivolts per second (mV/s) to 460 mV/s, utilizing a 100 μM DA solution. In FIG. 7A, it is evident that as the n increased, the $I_{pa}$ increased, with only a slight positive shift observed in the $E_{pa}$. The linear correlation between $I_{pa}$ and υ, as depicted in FIG. 7B, suggests that the oxidation of DA is a surface-controlled process [El-Raheem H., et al., New sensing platform of poly(ester-Urethane) Urea doped with gold nanoparticles for rapid detection of mercury ions in fish tissue, *RSC Adv.*, 2021, 11, 31845-31854, herein incorporated by reference in its entirety]. Conversely, in FIG. 7C-E linear plot of $I_{pa}$ against the $υ^{1/2}$, described by Equation (4) below, implies a diffusion-controlled process.

$$I_{pa} \, (\mu A) = 31.1897 \, υ^{1/2} \, (mV^{1/2}s^{-1/2}) - 4.2566 \, (R^2 = 0.9894) \quad (4)$$

Figure 7D:
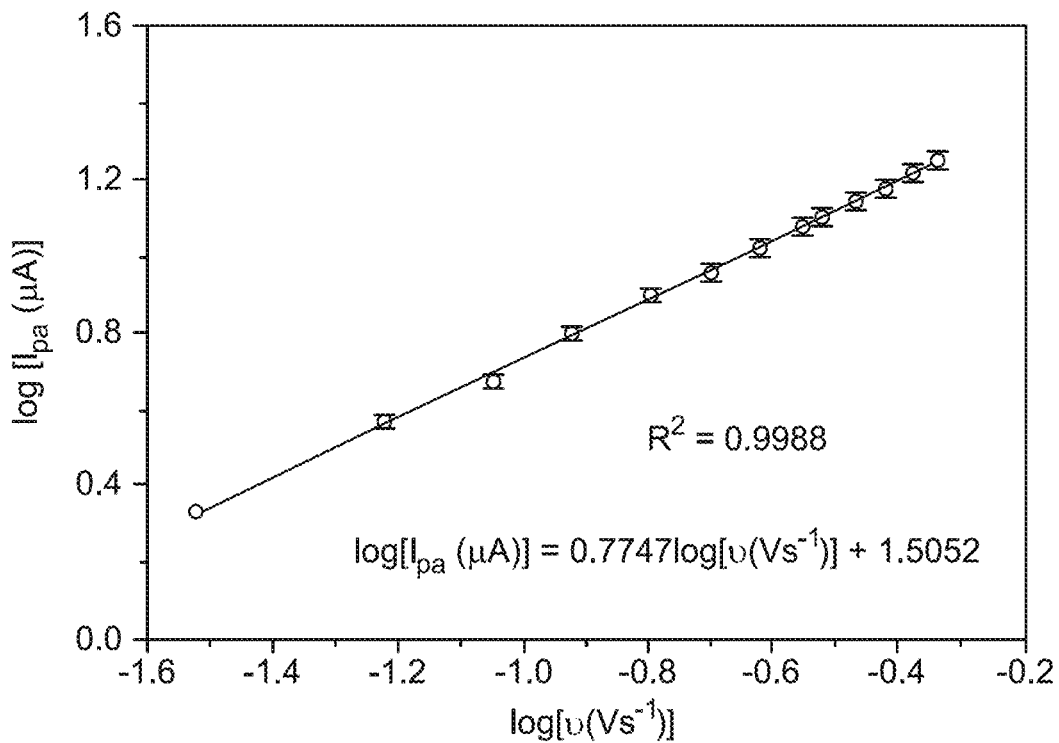
FIG. 7D depicts a linear plot of $\log(I_{pa})$ vs $\log(v)$, according to certain embodiments.
Figure 7E:
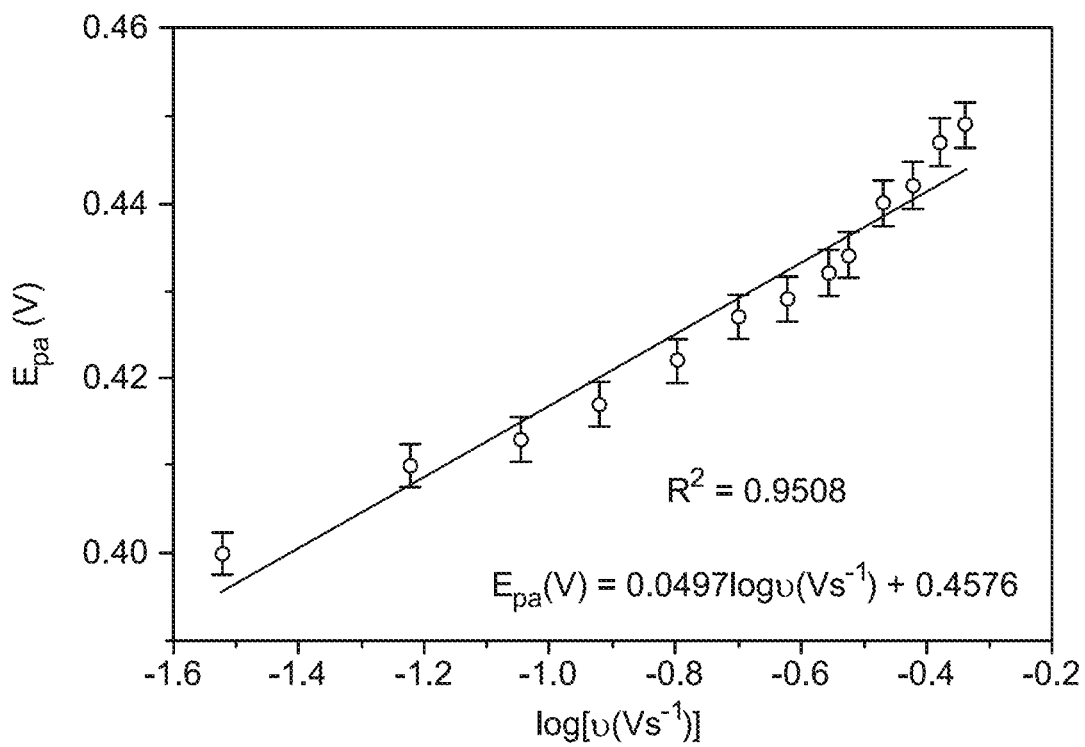
FIG. 7E depicts a linear plot of $E_{pa}$ vs. $\log(v)$, according to certain embodiments.

Also, in FIG. 7D—a linear curve of $E_{pa}$ vs. log(υ) was observed using Equation (5).

$$E_{pa} \, (V) = 0.0497 \, \log[υ(Vs-1)] + 0.4576 \, (R2 = 0.9508) \quad (5)$$

The n value for this irreversible DA oxidation may be calculated using Laviron's equation (Equation 6) [Ahmed J., et al., A novel gold-decorated porous silicon-poly(3-hexylthiophene) ternary nanocomposite as a highly sensitive and selective non-enzymatic dopamine electrochemical sensor, *Journal of Alloys and Compounds*, Volume 931, 2023, 167403, herein incorporated by reference in its entirety]:

$$E_{pa} = E^0 + (RT/\alpha nF)[\ln(RTk_s/\alpha nF) + \ln(υ)] \quad (6)$$

where: α represents the electron transfer coefficient, $k_s$ signifies the standard rate constant, U is the sweep rate, n represents the number of electrons involved, and $E_0$ denotes the formal potential. By utilizing the slope (0.0497) of the $E_{pa}$ vs. log(υ) plot, an αn value of 1.18, may be calculated where R=8.314 joule per kelvin per mole ($JK^{-1}$ $mol^{-1}$), T=298 K, and F=96,485 Coulombs per mole of electrons ($Cmol^{-1}$). Since a is 0.5 for an irreversible reaction, estimated 'n' value of 2.36 is obtained, which approximates to 2. Consequently, it may be concluded that the DA oxidation occurring at the $In_2O_3 \cdot ZnO@MC$/GCE electrode is a two-electron transfer process. Consequently, depending on the scan rate and pH findings, it may be deduced that DA oxidation at the $In_2O_3 \cdot ZnO@MC$/GCE surface involves a combined two-electron and two-proton transfer process, in accordance with existing literature [Ahmed J., et al., A novel gold-decorated porous silicon-poly(3-hexylthiophene) ternary nanocomposite as a highly sensitive and selective non-enzymatic dopamine electrochemical sensor, *Journal of Alloys and Compounds*, Volume 931, 2023, 167403,].

Determination of Sensor Parameters

Figure 8A:
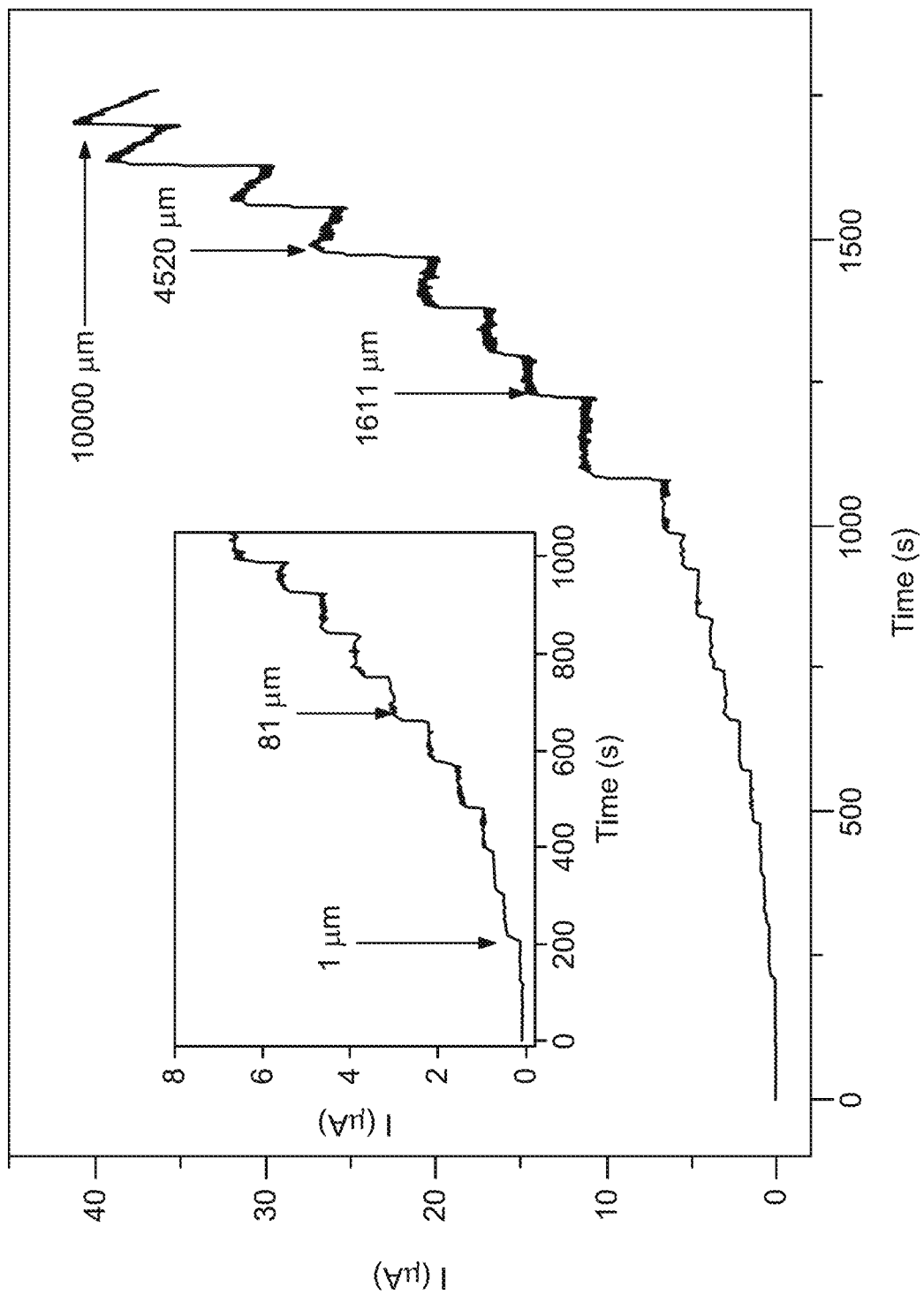
FIG. 8A depicts amperometric responses of $In_2O_3 \cdot ZnO@MC/GCE$ sensor during the additions of DA (0.5-10,000 µM) at +0.45 V, according to certain embodiments.
Figure 8B:
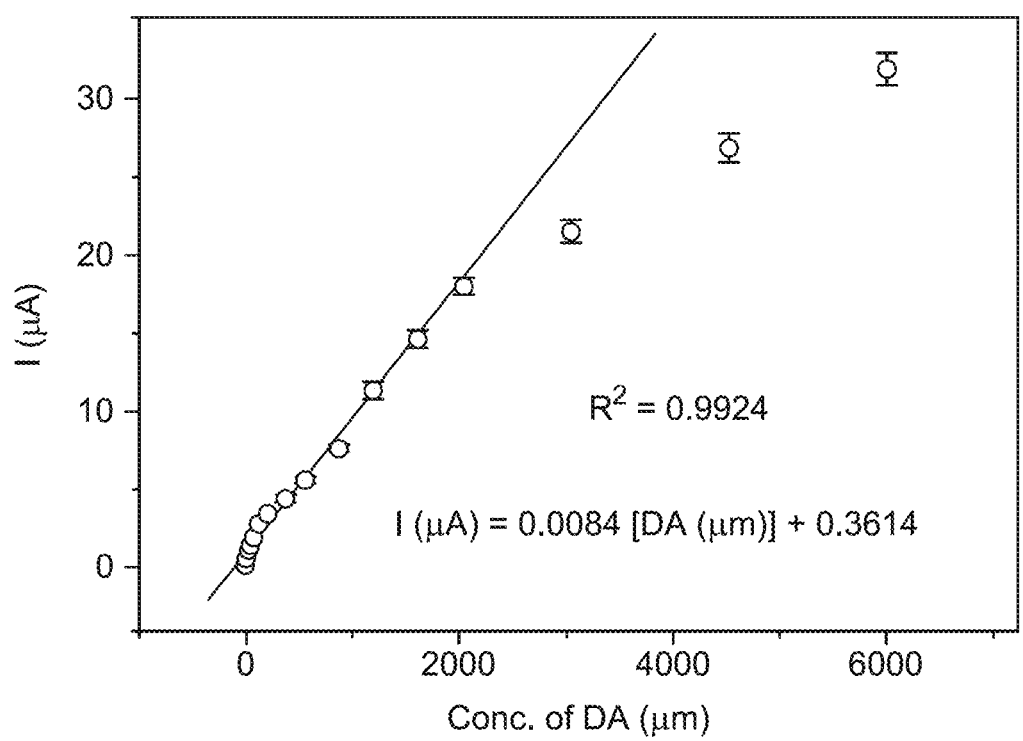
FIG. 8B depicts a calibration plot of $In_2O_3 \cdot ZnO@MC/GCE$ sensor corresponding to amperometric responses, according to certain embodiments.

In the disclosure, the performance of the $In_2O_3 \cdot ZnO@MC$/GCE sensor was studied through amperometry. In the approach, varying DA concentrations (0.5-10,000 μM) were added at different time intervals, and the amperometric response of the $In_2O_3 \cdot ZnO@MC$/GCE sensor at +0.45 V as presented in FIG. 8A was recorded. In this context, the current responses for each DA addition rapidly reached 95% of the maximum current within approximately 4 s. Furthermore, FIG. 8B depicts a linear segment in the calibration plot for DA concentrations ranging from 1 μM to 4520 μM, and this relationship is described by Equation (7).

$$I \, (\mu A) = 0.0084[DA] \, (\mu M) + 0.3614 \, (R^2 = 0.9924) \quad (7)$$

Thus, the linear detection range (LDR) of the $In_2O_3 \cdot ZnO@MC$/GCE sensor spans from 0.5 μM to 2056 mM was established. Furthermore, the sensitivity of $In_2O_3 \cdot ZnO@MC$/GCE sensor was determined to be 0.2153 microampere per micromolar per square centimeter ($\mu A \cdot \mu M^{-1} \cdot cm^{-2}$), with a limit of detection (LCD) of 0.024 μM (S/N=3) and a limit of quantification (LOQ) of 0.074 μM. Sensitivity was computed using the formula sensitivity=$S/A_{eff}$, where A eff represents effective surface area of modified electrode [Ahmed J., et al., A novel gold-decorated porous silicon-poly(3-hexylthiophene) ternary nanocomposite as a highly sensitive and selective non-enzymatic dopamine electrochemical sensor, *Journal of Alloys and Compounds*, Volume 931, 2023, 167403]. LCD and LOQ were calculated using the equations LCD=3.3($S_b$/S) and LOQ=10($S_b$/S), respectively. In this context, $S_b$ (0.000062) signifies the relative standard deviation (RSD) associated with five blank measurements, and S denotes the slope of the calibration curve.

Two factors, namely (i) an increase in $I_{pa}$ and (ii) a decrease in $E_{pa}$, serve as indicators of electrocatalyst performance. In the context, the utilization of the $In_2O_3·ZnO@MC$ nanocomposite for the fabrication of the GCE was aimed at enhancing its electrocatalytic activity. The $In_2O_3·ZnO@MC/GCE$ sensor effectively fulfilled both criteria. As observed in the CV responses shown in FIG. 4A, certain electrodes in this disclosure exhibited CV responses at approximately +0.55 V. However, the $In_2O_3·ZnO@MC/GCE$ assembly displayed a distinctive and enhanced oxidation peak for DA at a lower potential of +0.45 V. The active composite employed here includes a p-type $In_2O_3$ [Stankiewicz J., et al., P-type conduction in sputtered indium oxide films, *Appl. Phys. Lett.*, 96, 192108, herein incorporated by reference in its entirety] and an n-type ZnO semiconductor [Kaupuˇzs J., et al., Origin of N-type conductivity in ZnO crystal and formation of Zn and ZnO nanoparticles by laser radiation, *Optics & Laser Technology*, Volume 111, 2019, Pages 121-128, herein incorporated by reference in its entirety]. Consequently, this combination introduces an interfacial p-n junction with an electron donor-acceptor pair. Such a combination may provide multiple redox-active sites that enhance the adsorption and diffusion of DA molecules onto the electrode surface, consequently promoting conductivity. Additionally, MC is a component in the $In_2O_3·ZnO@MC/GCE$ electrode designed for DA sensing. The mesoporous structure of MC provides a high surface area and promotes the dispersion of $In_2O_3·ZnO$ NPs, which results in facilitating a larger interface between the electrode and DA and enhancing the catalytic activity for DA oxidation, resulting in improved sensitivity and electrochemical performance. Furthermore, the porous nature enhances mass transport, enabling efficient electron transfer during DA sensing. The electrical conductivity of MC contributes to enhanced sensitivity and response times. Moreover, MC improves the stability and durability of the electrode, aiding long-term sensor performance. Additionally, MC prevents aggregation of NPs, providing a uniform distribution for consistent and reproducible sensing performance. Furthermore, this combination leads to a reduction of $E_{pa}$ from +0.55 V to +0.45 V. In contrast to the other electrodes employed in this disclosure, the $In_2O_3·ZnO@MC/GCE$ sensor exhibited a negative shift in $E_{pa}$ and a larger positive shift in $I_{pa}$, as depicted in FIG. 4A. In comparison to a bare GCE during DA oxidation, the $In_2O_3·ZnO@MC/GCE$ sensor achieved an approximately two-fold increase in $I_{pa}$.

Moreover, in line with literature support, DA readily donates electrons to the $In_2O_3·ZnO@MC$ surface.

Example 4: Selectivity, Repeatability, Reproducibility, and Stability Studies

Figure 9A:
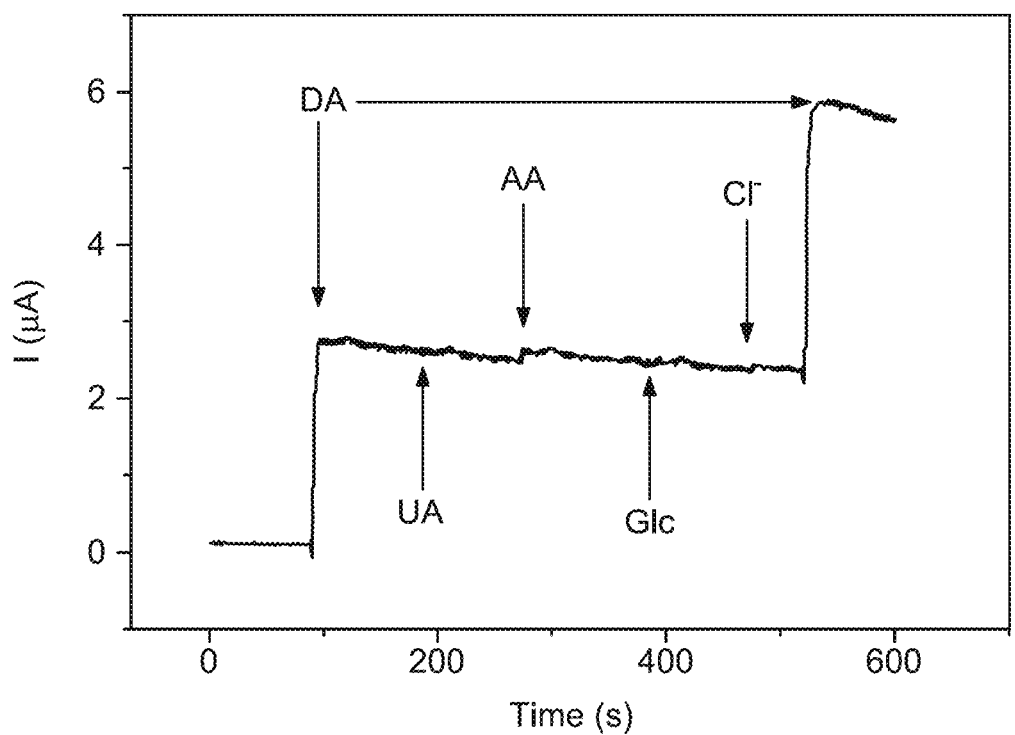
FIG. 9A depicts $In_2O_3 \cdot ZnO@MC/GCE$ sensor's amperometric (i-t) response at +0.45 V after successively adding 300 µM of DA, uric acid (UA), ascorbic acid (AA), glucose (Glc), chloride (Cl$^-$) and DA, according to certain embodiments.
Figure 9B:
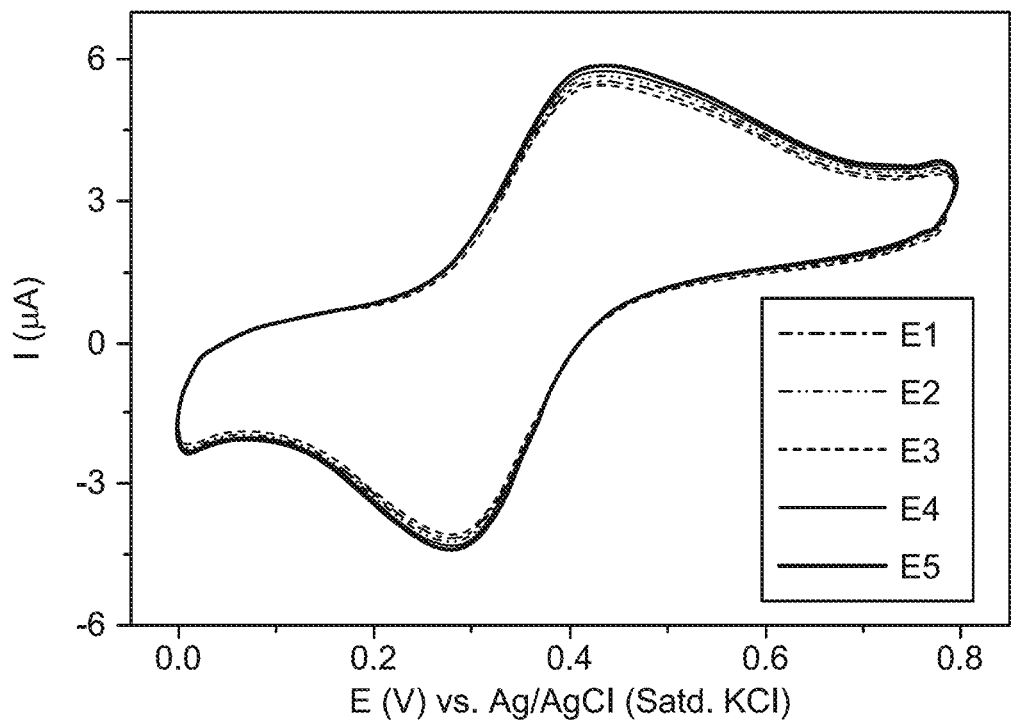
FIG. 9B depicts repeatability investigation of CV responses of $In_2O_3 \cdot ZnO@MC/GCE$, according to certain embodiments.
Figure 9C:
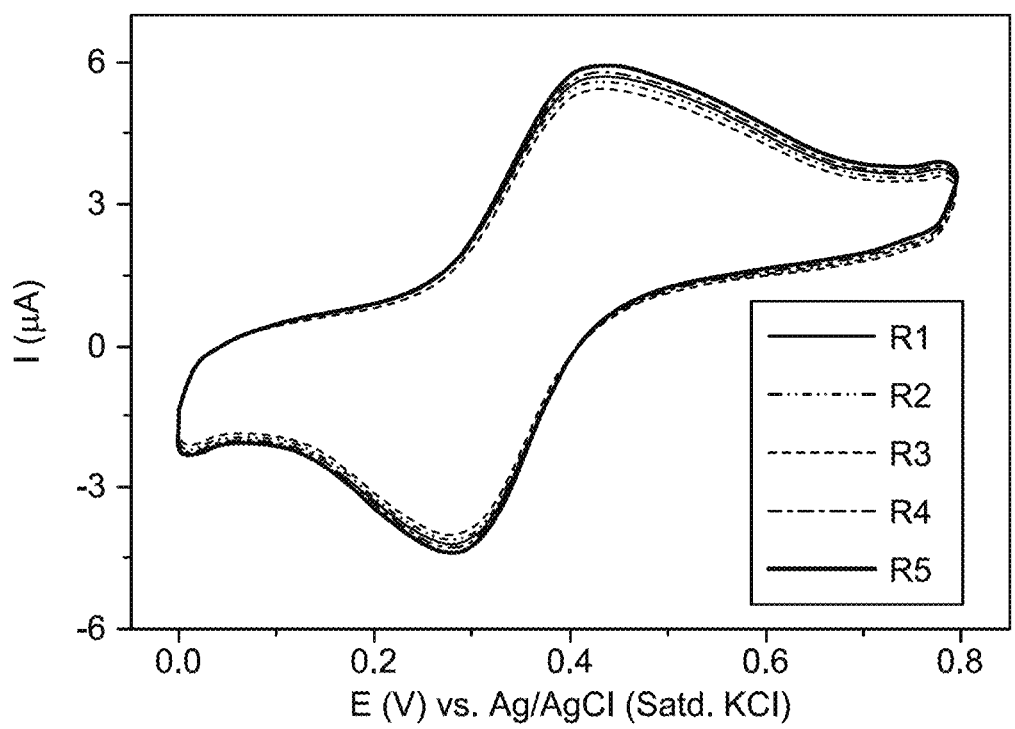
FIG. 9C depicts reproducibility investigation of CV responses of $In_2O_3 \cdot ZnO@MC/GCE$, according to certain embodiments.
Figure 9D:
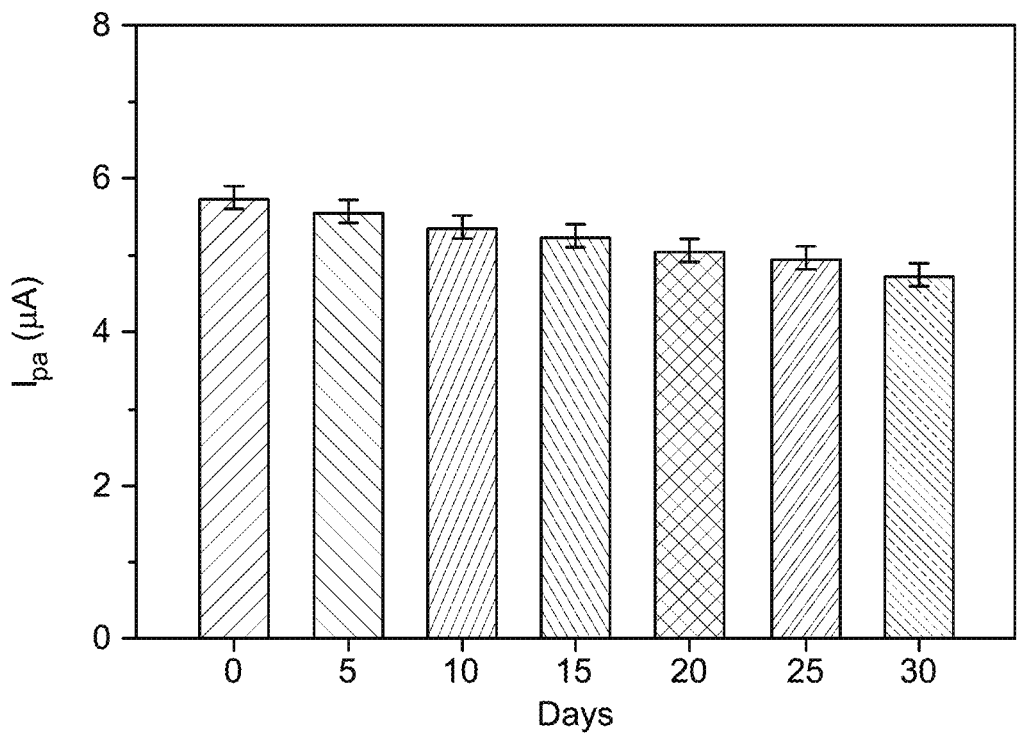
FIG. 9D depicts stability investigation of CV responses of $In_2O_3 \cdot ZnO@MC/GCE$, according to certain embodiments.

In order to examine the $In_2O_3·ZnO@MC/GCE$ sensor's selectivity, it was subjected to closely related substances, including uric acid (UA), glycerin (Glc), ascorbic acid (AA), and chloride ($Cl^-$). The amperometric responses obtained with 300 μM DA and an identical concentration of each interfering compound are shown in FIG. 9A. Notably, the introduction of DA generated a substantial amperometric response, while the interfering chemicals displayed no such response. This clearly illustrates the selectivity $In_2O_3·ZnO@MC/GCE$ sensor in detecting DA. Additionally, various assessments of the $In_2O_3·ZnO@MC/GCE$ sensor were conducted by recording CVs with 100 μM DA. FIG. 9B showcases the repeatability investigation, where a freshly modified $In_2O_3·ZnO@MC/GCE$ sensor was employed for five consecutive runs. Impressively, this yielded an excellent level of repeatability, with a mere 4.1% RSD and virtually identical CV responses. FIG. 9C presents the reproducibility analysis of the $In_2O_3·ZnO@MC/GCE$ sensor using five newly fabricated $In_2O_3·ZnO@MC/GCE$ electrodes (E1-E5). This evaluation revealed a 4.5% RSD in the fluctuations of $I_{pa}$ in the CV responses, affirming notable reproducibility. To assess the stability of a freshly prepared $In_2O_3·ZnO@MC/GCE$ sensor, CV responses were periodically recorded and stored it at room conditions. The results of the stability study, depicted in FIG. 9D, indicate that 30 days after being kept at ambient conditions, the $I_{pa}$ value in the CVs remained at approximately 82.5% of its initial value, with the $In_2O_3·ZnO@MC/GCE$ surface of the sensor remaining intact.

An electro-oxidation process initiates upon the interaction of the DA molecule with the surface of $In_2O_3·ZnO@MC$ nanocomposite. Here, the conduction band of $In_2O_3·ZnO@MC$ nanocomposite accepts electrons from DA molecules. This electron transfer enhances the conductivity of the $In_2O_3·ZnO@MC/GCE$ sensor, consequently resulting in an improved response in CV. Notably, the $In_2O_3·ZnO@MC/GCE$ sensor exhibits robust sensitivity and a broader LDR for DA determination than existing conventional DA sensors, as evidenced in Table 2.

TABLE 2

Comparison of sensor parameters among presently available non-enzymatic DA sensors.

| Active material | Method | LDR (μM) | LOD (nM) | Sensitivity (μA · μM$^{-1}$ · cm$^{-2}$) | pH | Ref. |
| --- | --- | --- | --- | --- | --- | --- |
| Au@PSi-P3HT | Amp | 1.0-460 | 630 | 0.5112 | 7 | [1] |
| PSi | Amp | 0.5-333.3 | 3.2 | 0.2362 | 7 | [2] |
| MXene/PPy | DPV | 12.5-125 | 0.4 | 0.0059* | 7 | [3] |
| Ni-MOF | DPV | 0.20-100 | 60 | 0.0560* | 7 | [4] |
| rCAG | AMP | 0.2-90 | 30 | 0.0668 | 7.4 | [5] |
| $Cu_2O$ HMS/CB | Amp | 0.099-708 | 39.6 | 0.0492* | 5.7 | [6] |
| ZnO@PANI | CV | 2.4-20 | 16.6 | 0.0890* | 7 | [7] |
| $In_2O_3·ZnO@MC$ | Amp | 0.5-2056 | 24 | 0.2153 | 7 | This disclosure |

[1]: Ahmed J., et al., A novel gold-decorated porous silicon-poly(3-hexylthiophene) ternary nanocomposite as a highly sensitive and selective non-enzymatic dopamine electrochemical sensor, *Journal of Alloys and Compounds*, Volume 931, 2023, 167403,
[2]: Ahmed J., et al., Development of an amperometric biosensor for dopamine using novel mesoporous silicon nanoparticles fabricated via a facile stain etching approach, Physica E: Low-dimensional Systems and Nanostructures, Volume 135, 2022, 114952.
[3]: You Q., et al., *Simultaneous recognition of dopamine and uric acid in the presence of ascorbic acid via an intercalated Mxene/Ppy nanocomposite*, Sensors, 2021, 21, 9, 3069
[4]: Huang Z. et al., *Electrochemical sensing of dopamine using a Ni-based metal-organic framework modified electrode*, Ionics, 27, 1339-1345 2021
[5]: Ding A. et al., *Sensitive dopamine sensor based on three dimensional and macroporous carbon aerogel microelectrode*, International Journal of Electrochemical Science, Volume 13, Issue 5, 2018, Pages 4379-4389
[6]: Wu L., et al., *Dopamine sensor based on a hybrid material composed of cuprous oxide hollow microspheres and carbon black*, Microchim Acta, 182, 1361-1369, 2015
[7]: Fayemi O., et al., Electrochemical sensor for the detection of dopamine in real samples using polyaniline/NiO, ZnO, and $Fe_3O_4$ nanocomposites on glassy carbon electrode, Journal of Electroanalytical Chemistry, Volume 818, 2018, Pages 236-249, each herein incorporated by reference in its entirety.

Figure 10:
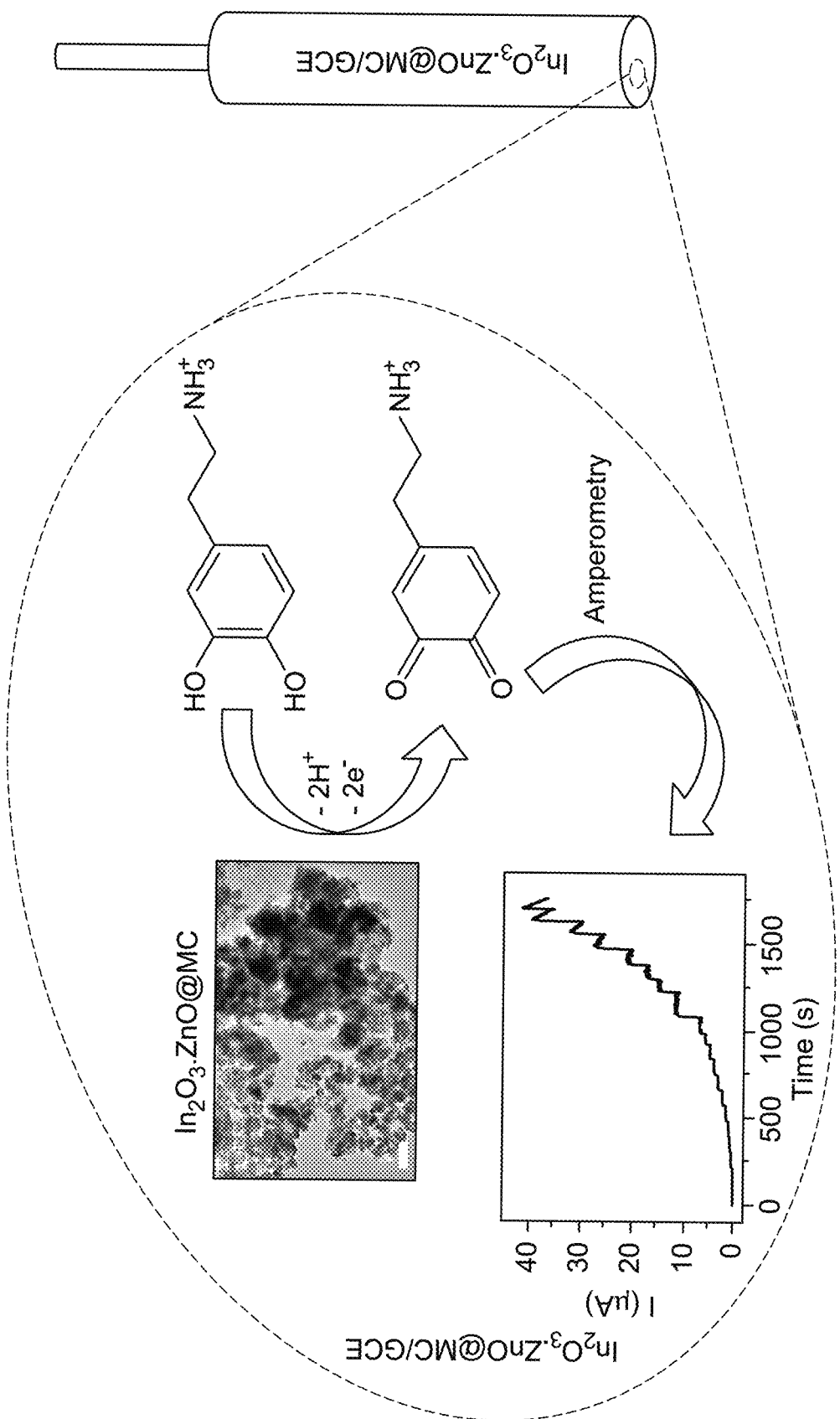
FIG. 10 is a schematic illustration of electrochemical DA oxidation using $In_2O_3 \cdot ZnO@MC/GCE$ sensor, according to certain embodiments.

Based on the experimental findings, it may be concluded that the oxidation of DA at the $In_2O_3 \cdot ZnO$@MC/GCE involves a mixed process, encompassing the transfer of two electrons and two protons. It is noteworthy that the $In_2O_3 \cdot ZnO$@MC nanocomposite demonstrates exceptional activity in the electro-oxidation of DA. This heightened activity may be attributed to the effective interaction between the electrode and the analyte, confirming the suitability of the $In_2O_3 \cdot ZnO$@MC/GCE sensor for DA detection. FIG. 10. provides a visual model illustrating the electrochemical oxidation of DA at the $In_2O_3 \cdot ZnO$@MC/GCE sensor.

Investigation of Real Samples

Figure 11A:
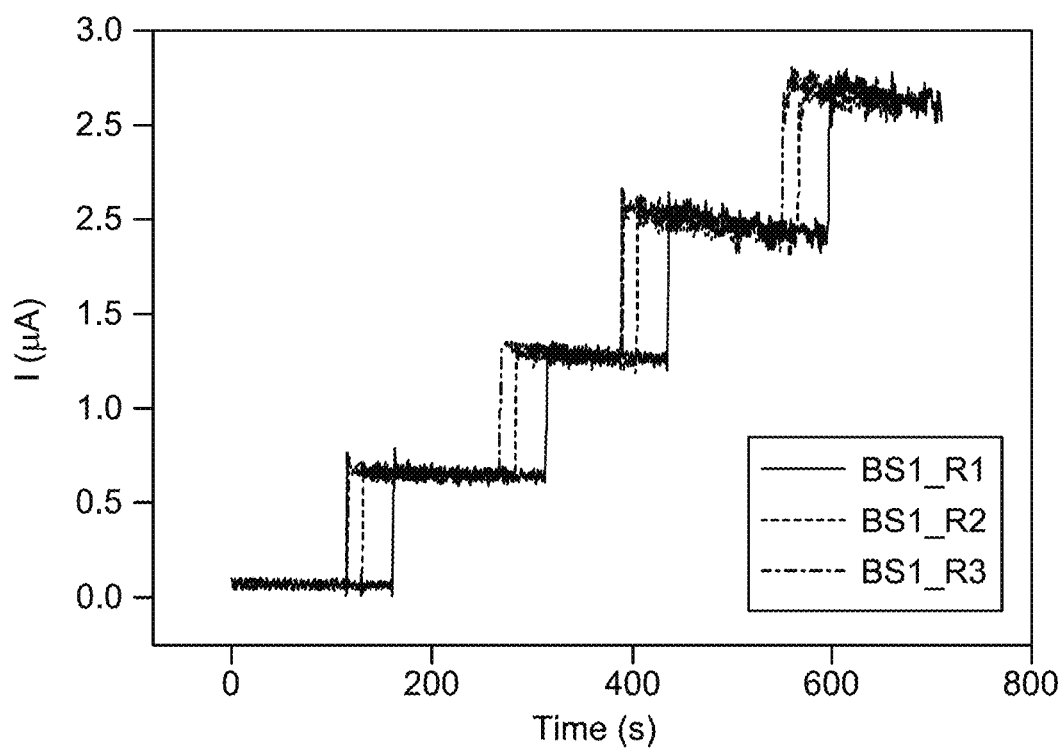
FIG. 11A depicts an amperometric responses of $In_2O_3 \cdot ZnO@MC/GCE$ sensor at +0.45 V during the addition of 200 microliter (µL) of human blood serum samples (BS1) and 50 micromolar (µM) of DA (repeated three times) into 10 mL PBS, according to certain embodiments.
Figure 11B:
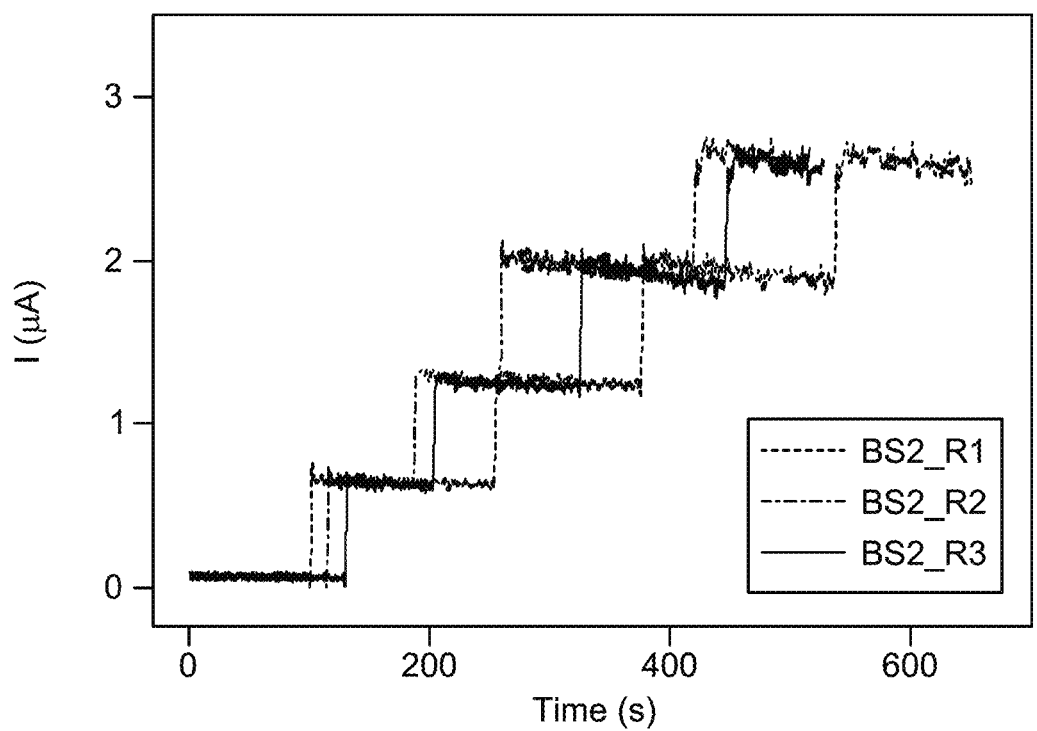
FIG. 11B depicts an amperometric responses of $In_2O_3 \cdot ZnO@MC/GCE$ sensor at +0.45 V during the addition of 200 µL of human blood serum samples (BS2) and 50 µM of DA (repeated three times) BS2 into a 10 mL PBS, according to certain embodiments.
Figure 11C:
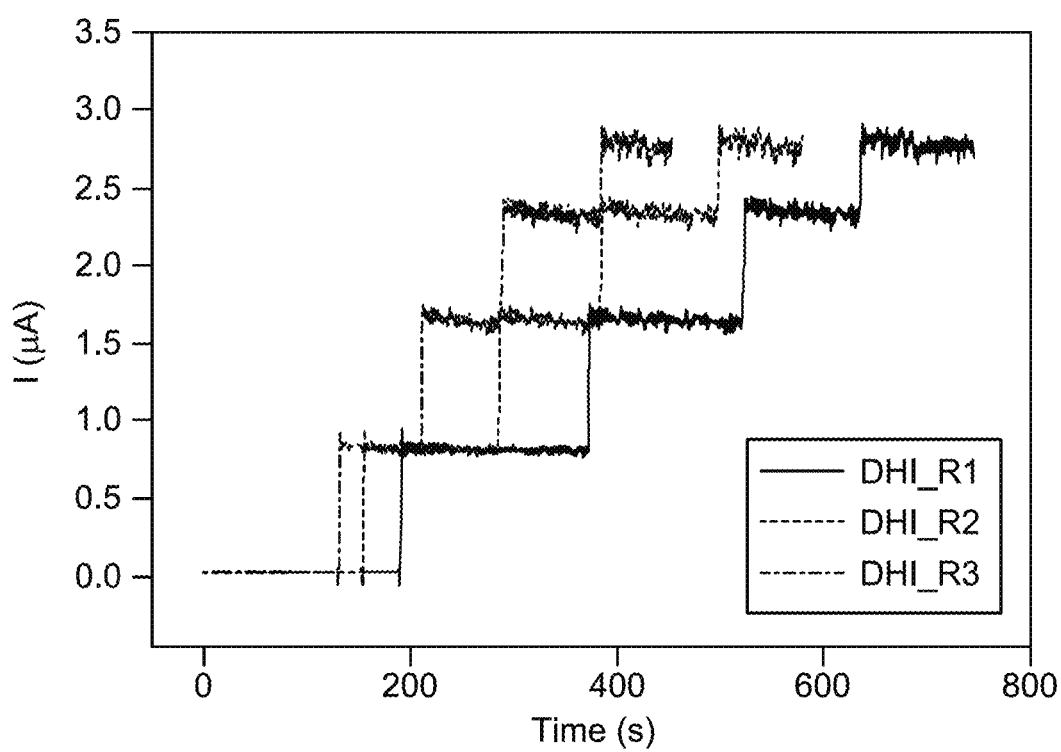
FIG. 11C depicts an amperometric responses of $In_2O_3 \cdot ZnO@MC/GCE$ sensor at +0.45 V during the addition of 25 µM of 0.02 M DA hydrochloride injection (DHI) followed by 50 µL of a standard DA solution (repeated three times) into a 10 mL PBS, according to certain embodiments.

To assess the efficacy of the $In_2O_3 \cdot ZnO$@MC/GCE sensor, measurements of DA in human blood serum samples (designated as BS1 & BS2) and a commercial DA hydrochloride injection (referred to as DHI) was conducted as shown in FIG. 11A-11C. The established standard addition procedure was followed, consistent with previous reports. The procedure was initiated by recording the amperometric responses of the $In_2O_3 \cdot ZnO$@MC/GCE sensor at +0.45 V (vs. Ag/AgCl) after adding 200 μL of BS1 and 50 μM of DA (repeated three times) into a 10 ml phosphate-buffered saline (PBS) solution. These measurements were conducted with identical parameters, replicated three times. Subsequently, the same protocol was executed for BS2. Additionally, the standard DHI addition procedure was adhered to by introducing 25 μM of 0.02 M DHI, followed by 50 μL of a standard DA solution (repeated three times), into a 10 ml PBS solution. The outcomes of the analysis on spiked serums and DHI samples are summarized in Table 3. The results affirm the reliability of the $In_2O_3 \cdot ZnO$@MC/GCE sensor. Notably, the determined amount of DA hydrochloride in DHI closely corresponded to 97.5% of the manufacturer's specified value. In conclusion, it may be asserted that the $In_2O_3 \cdot ZnO$@MC/GCE sensor proves accurate and valuable for DA determination in real-world samples.

TABLE 3

DA detection from spiked samples.

| Real sample | DA Added (μM) | DA determined (μM) | DA in real sample (μM) | Recovery (%) | RSD (%) (n = 3) |
|---|---|---|---|---|---|
| BS1 | 0 | 3.8 | 3.8 | — | 4.1 |
|  | 50 | 53.9 | 3.8 | 102.6 | 4.3 |
| BS2 | 0 | 3.6 | 3.6 | — | 3.9 |
|  | 50 | 53.5 | 3.6 | 97.2 | 4.1 |
| DHI | 0 | 49.5 | 49.5 | — | 3.6 |
|  | 50 | 99.2 | 49.5 | 99.4 | 4.4 |

This disclosure presents the effective design, synthesis, and systematic characterization of a $In_2O_3 \cdot ZnO$@MC nanocomposite. DA, a biomolecule involved in neurotransmission, is implicated in a variety of neurological disorders. Therefore, accurate detection of DA allows for the swift diagnosis of conditions arising from abnormal DA levels. Consequently, nanocomposite material $In_2O_3 \cdot ZnO$@MC was used as the active nanomaterial for the fabrication of a glassy carbon electrode (GCE). The structural and morphological properties of $In_2O_3 \cdot ZnO$@MC were comprehensively analyzed utilizing a variety of characterization techniques to confirm its functionality as the sensing nano material. This innovative sensor demonstrates the ability to detect a wide range of DA concentrations, ranging from 0.5 μM to 2056 μM, in a neutral phosphate buffer solution, exhibiting a high sensitivity of 0.2153 $\mu A \cdot \mu M^{-1} \, cm^{-2}$ and an acceptable detection limit of 0.024 μM. Subsequently, the nanocomposite was used to develop a highly sensitive and selective amperometric DA sensor. The fabrication of the innovative DA sensor involved a straightforward process. Its distinct features include a wide LDR, high sensitivity for accurately measuring DA concentrations encompassing both high and low levels, minimal interference, rapid response time, a reasonable detection limit, and outstanding stability, reproducibility, and repeatability. These characteristics underscore the potential of this DA sensor for accurate DA determination. To validate its accuracy, the $In_2O_3ZnO$@MC/GCE sensor was tested using spiked human-blood serums and commercial DA hydrochloride injection, yielding promising results. Finally, the sensor design approach outlined in the disclosure establishes a valuable framework for the development of future DA sensors. This sensor enables precise DA level measurements in real samples due to its high sensitivity and selectivity. Moreover, it is a dependable and trustworthy sensor for DA measurement due to its outstanding reproducibility, repeatability, and stability.

Numerous modifications and variations of the present disclosure are possible in light of the above teachings. It is therefore to be understood that within the scope of the appended claims, the disclosure may be practiced otherwise than as specifically described herein.

The invention claimed is:
1. A dopamine (DA) sensor, including:
a glassy carbon electrode including a $In_2O_3$-doped ZnO decorated mesoporous carbon ($In_2O_3 \cdot ZnO$@MC) nanocomposite material,
wherein the $In_2O_3ZnO$@MC nanocomposite material includes granular $In_2O$ ZnO nanoparticles (NPs) dispersed on a mesoporous carbon matrix,
wherein the granular $In_2O_3$—ZnO NPs cover at least 50% of the mesoporous carbon matrix, and
wherein the amount of indium in the $In_2O$ ZnO@MC nanocomposite material is in a range from 10 to 30 weight percent (wt. %) based on the total weight of the In$_2$O$_3$·ZnO@MC nanocomposite material, the amount of zinc in the In$_2$O$_3$·ZnO(MC nanocomposite material is in a range from 30 to 70 wt. % based on the total weight of the In O$_3$ZnO@MC nanocomposite material, the amount of oxygen in the In$_2$O$_3$·ZnO@MC nanocomposite material is in a range from 10 to 30 wt. % based on the total weight of the In$_2$O$_3$·ZnO@MC nanocomposite material, and the amount of carbon in the In$_2$O$_3$·ZnO@MC nanocomposite material is in a range from 8 to 25 wt. % based on the total weight of the In$_2$O$_3$·ZnO@MC nanocomposite material.

2. The sensor of claim 1, wherein the amount of indium in the In$_2$O$_3$·ZnO@MC nanocomposite material is in a range from 15 to 25 wt. % based on the total weight of the In$_2$O$_3$·ZnO@MC nanocomposite material.

3. The sensor of claim 2, wherein the amount of indium in the In$_2$O$_3$·ZnO@MC nanocomposite material is in a range from 20 to 25 wt. % based on the total weight of the In$_2$O$_3$·ZnO@MC nanocomposite material.

4. The sensor of claim 1, wherein the amount of zinc in the In$_2$O$_3$·ZnO@MC nanocomposite material is in a range from 40 to 60 wt. % based on the total weight of the In$_2$O$_3$·ZnO@MC nanocomposite material, and the amount of oxygen in the In$_2$O$_3$·ZnO@MC nanocomposite material is in a range from 12 to 25 wt. % based on the total weight of the In$_2$O$_3$·ZnO@MC nanocomposite material.

5. The sensor of claim 4, wherein the amount of zinc in the In$_2$O$_3$·ZnO@MC nanocomposite material is in a range from 45 to 55 wt. % based on the total weight of the In$_2$O$_3$·ZnO@MC nanocomposite material, and the amount of oxygen in the In$_2$O$_3$·ZnO@MC nanocomposite material is in a range from 14 to 20 wt. % based on the total weight of the In$_2$O$_3$—ZnO@MC nanocomposite material.

6. The sensor of claim 1, having a sensitivity for DA from to 0.10 to 0.30 microampere per micromolar per square centimeter ($\mu$A·$\mu$M$^{-1}$·cm$^{-2}$).

7. The sensor of claim 6, having a sensitivity for DA from 0.15 to 0.25 $\mu$A·$\mu$M$^{-1}$·cm$^2$.

8. The sensor of claim 7, having a sensitivity for DA from 0.20 to 0.25 $\mu$A·$\mu$M$^{-1}$·cm$^2$.

9. The sensor of claim 1, having a limit of detection (LOD) for DA of less than or equal to 35 nanomolar (nM).

10. The sensor of claim 9, having a LOD for DA of less than or equal to 30 nM.

11. The sensor of claim 10, having a LOD for DA of less than or equal to 25 nM.

12. The sensor of claim 1, having a linear detection range for DA spanning from 0.5 to 2056 $\mu$M.

13. The sensor of claim 12, having a linear detection range for DA spanning from 0.5 to 1000 $\mu$M.

14. The sensor of claim 13, having a linear detection range for DA spanning from 0.5 to 500 $\mu$M.

15. The sensor of claim 1, having a Relative Standard Deviation (RSD) for detecting DA of less than or equal to 6%.

16. The sensor of claim 15, having a RSD for detecting DA of less than or equal to 5%.

17. The sensor of claim 16, having a RSD for detecting DA of less than or equal to 4.5%.

18. The sensor of claim 1, wherein the granular In$_2$O$_3$·ZnO NPs cover at least 60% of the mesoporous carbon matrix.

19. The sensor of claim 18, wherein the granular In$_2$O$_3$·ZnO NPs cover at least 75% of the mesoporous carbon matrix.

20. The sensor of claim 19, wherein the granular In$_2$O$_3$·ZnO NPs cover at least 90% of the mesoporous carbon matrix.

* * * * *